US012505283B2

(12) United States Patent
Plotkin

(10) Patent No.: US 12,505,283 B2
(45) Date of Patent: Dec. 23, 2025

(54) COMPUTER-IMPLEMENTED METHODS AND SYSTEMS FOR DYNAMIC PROMPT GENERATION AND INTEGRATION WITH LARGE LANGUAGE MODELS FOR DOCUMENT REVISION

(71) Applicant: Quabbin Patent Holdings, Inc., Marlborough, MA (US)

(72) Inventor: Robert Plotkin, Manalapan, NJ (US)

(73) Assignee: Quabbin Patent Holdings, Inc., Marlborough, MA (US)

(*) Notice: Subject to any disclaimer, the term of this patent is extended or adjusted under 35 U.S.C. 154(b) by 0 days.

(21) Appl. No.: 18/995,049

(22) PCT Filed: Oct. 9, 2024

(86) PCT No.: PCT/US2024/050403
§ 371 (c)(1),
(2) Date: Jan. 15, 2025

(87) PCT Pub. No.: WO2025/080599
PCT Pub. Date: Apr. 17, 2025

(65) Prior Publication Data
US 2025/0258994 A1    Aug. 14, 2025

Related U.S. Application Data

(60) Provisional application No. 63/588,835, filed on Oct. 9, 2023.

(51) Int. Cl.
*G06F 40/166* (2020.01)
*G06F 3/0482* (2013.01)
(Continued)

(52) U.S. Cl.
CPC .......... *G06F 40/166* (2020.01); *G06F 3/0482* (2013.01); *G06F 3/0486* (2013.01); *G06F 40/284* (2020.01); *G06F 40/40* (2020.01)

(58) Field of Classification Search
CPC ..................................................... G06F 40/166
See application file for complete search history.

(56) References Cited

U.S. PATENT DOCUMENTS

| 5,493,606 A * | 2/1996 | Osder et al. ............ H04M 1/64 |
| 2006/0203980 A1 | 9/2006 | Starkie |

(Continued)

FOREIGN PATENT DOCUMENTS

| CN | 116700839 A | 9/2023 |
| CN | 116795973 A | 9/2023 |

(Continued)

OTHER PUBLICATIONS

Office Action dated May 8, 2025 for U.S. Appl. No. 19/054,800 (pp. 1-12).

(Continued)

*Primary Examiner* — James J Debrow
(74) *Attorney, Agent, or Firm* — Blueshift IP; Robert Plotkin

(57) ABSTRACT

Computer-implemented methods and systems interface with a language model (e.g., a Large Language Model (LLM)) to assist in document revision. The methods and systems allow text to be selected within a document and an action definition to be selected from an action definition library. The text and/or the action definition may be selected using a graphical user interface (GUI). An action defined by the selected action definition is applied to the selected text to generate text. For example, the selected action definition may include a prompt, and the prompt may be combined with the selected text to generate a combined prompt. The combined prompt may be provided as an input to the LLM, which may generate the generated text. The generated text may be integrated into the document.

22 Claims, 2 Drawing Sheets

(51) Int. Cl.
    *G06F 3/0486*      (2013.01)
    *G06F 40/284*      (2020.01)
    *G06F 40/40*      (2020.01)

(56) References Cited

U.S. PATENT DOCUMENTS

| | | | |
|---|---|---|---|
| 2014/0379615 A1* | 12/2014 | Brigham et al. | G06N 99/005 |
| 2020/0153687 A1* | 5/2020 | Ayyagari et al. | H04L 41/0806 |
| 2021/0042662 A1* | 2/2021 | Pu et al. | G06N 20/00 |
| 2022/0229832 A1* | 7/2022 | Li et al. | G06F 16/248 |
| 2023/0075884 A1 | 3/2023 | Jakobsson | |
| 2023/0316006 A1* | 10/2023 | Tunstall-Pedoe et al. | G06F 40/56 |
| 2024/0112394 A1 | 4/2024 | Neal | |
| 2024/0338860 A1 | 10/2024 | Trzyna | |
| 2024/0419907 A1 | 12/2024 | Laprise | |
| 2024/0420418 A1 | 12/2024 | Wu | |
| 2025/0007870 A1* | 1/2025 | Kim et al. | H04L 51/21 |
| 2025/0013438 A1* | 1/2025 | G00dman et al. | G06F 8/35 |
| 2025/0118022 A1* | 4/2025 | Fitzmaurice et al. | G06T 17/10 |

FOREIGN PATENT DOCUMENTS

| | | |
|---|---|---|
| CN | 117313746 A | 12/2023 |
| CN | 117409109 A | 1/2024 |
| EP | 1006452 A2 | 6/2000 |

OTHER PUBLICATIONS

Cohen, Reuven, "The Future of AI Infused Documents: The Intelligent Document Format," LinkedIn, Feb. 5, 2024. 2 pages.
Openai, "A New Way of Working With ChatGPT to Write and Code," Introducing Canvas, Oct. 3, 2024, 8 pages. openai.com/index/introducing-canvas/.
"How do I add a Ghostwriter prompt?" Cloze Help Center, 9 pages, printed Oct. 10, 2023, URL: htpps://help.cloze.com/article/2680-how-do-i-add-a-ghostwriter-prompt.
"Word GPT Plus—a useful add-in to use chatGPT in Microsoft Word," Apr. 27, 2023, 3 pages.
AI-Writer.com, "Use AI to your advantage, without sacrificing on quality," 2023, Product Guide, 22 pages.
Coyer, Cassandre, "LexisNexis Brings Lexis Create to U.S., Announces New Gen AI Capabilities Ahead," Aug. 2, 2023, 2 pages. URL: https://www.law.com/legaltechnews/2023/08/02/lexisnexis-brings-lexis-create-to-u-s-announces-new-gen-ai-capabilities-ahead/.
Coyer, Cassandre, "LexisNexis Publicly Releases Generative AI-Powered Lexis+AI, With New Functionalities," Oct. 25, 2023, 2 pages. URL: https://www.law.com/legaltechnews/2023/10/25/lexisnexis-publicly-releases-generative-ai-powered-lexis-ai-with-new-functionalities/.
Dipshan, Rhys, "LexisNexis Expands Generative AI Offerings With Lexis Snapshot and Lexis Create Integration," Nov. 14, 2023, 2 pages. URL: https://www.law.com/legaltechnews/2023/11/14/lexisnexis-expands-generative-ai-offerings-with-lexis-snapshot-and-lexis-create-integration/.
Gemini, "Supercharge your creativity and productivity," Release updates, 2024, 12 pages. URL: gemini.google.com/updates.
Ghostwriter-AI, Solving insight problems with clarity, simplicity and innovation, "Ghostwriter Add-ins for Microsoft Office," printed Oct. 10, 2023, 30 pages. URL: https://www.ghostwriter-ai.com/.
Guerra, Marci, "Chat GPT for Microsoft Word: A Guide to Integration and Usage," Brandalytics, Apr. 14, 2023. 11 pages.
International Search Report and Written Opinion issued in App. No. PCT/US2024/050403, dated Jan. 15, 2025, 10 pages.
Jasper, "Meet Jasper. On-brand AI content wherever you create." Product Guide, printed Oct. 1, 2023, 49 pages.
Kowalczyk, Mikolaj, "A Step-by-step Guide to Prompt Engineering: Best Practices, Challenges, and Examples," printed Oct. 1, 2023, 16 pages.
Lago, Juan Pablo, "Guiding LLM Behavior: The Art of Prompt Engineering," Aug. 15, 2023, 13 pages. URL: https://blog.marvik.ai/2023/08/15/prompt-engineering-guide/.
Li, Abner, "Gemini now lets you tune and modify responses with a prompt," Mar. 6, 2024, 3 pages. URL: 9to5google.com/2024/03/06/gemini-modify-tune-response/.
OpenAI, Blog, "New models and developer products announced at DevDay," GPT-4 Turbo with 128K context and lower prices, the new Assistants API, GPT-4 Turbo with Vision, DALL-E 3 API, and more. Nov. 6, 2023 announcements, 13 pages.
Peppercontent "Peppertype just got better!" Introducing the all-new AI-powered Content Marketing Platform, printed Oct. 1, 2023, 10 pages.
Sha, Arjun, "How to Integrate ChatGPT Into Microsoft Word," last updated Jun. 19, 2023. 17 pages. URL: https://beebom.com/how-add-chatgpt-microsoft-word/.
Shi, F et al. "Prompt Space Optimizing Few-shot Reasoning Success with Large Language Models," Jun. 6, 2023, 25 pages.
Spataro, Jared, "Introducing Microsoft 365 Copilot—your copilot for work," Mar. 16, 2023, CVP Modern Work & Business Applications, Official Microsoft Blog, 14 pages.
Stanojevic, Milan, "How to Integrate ChatGPT With Word [Quickest Ways]," To use ChatGPT in Word, you need to rely on third-party add-ons, Windowsreport, updated Oct. 4, 2023, 19 pages.
What's New in Copilot, techcommunity.microsoft.com/blog/microsoft365copilotblog/whats-new-in-copilot--august-2024/4226565, Aug. 30, 2024, 5 pages.
Woodie, Alex, "DSPy Puts 'Programming Over Prompting' in AI Model Development", Datanami, Aug. 25, 2023. 4 pages.
www.microsoft.com, "Introducing Microsoft 365 Copilot13 your copilot for work." 2023, 12 pages.
Yeh, C. et al. "GhostWriter: Augmenting Collaborative Human-AI Writing Experiences Through Personalization and Agency," Feb. 13, 2024, 29 pages.

* cited by examiner

COMPUTER-IMPLEMENTED METHODS AND SYSTEMS FOR DYNAMIC PROMPT GENERATION AND INTEGRATION WITH LARGE LANGUAGE MODELS FOR DOCUMENT REVISION

BACKGROUND

In an age where technology intertwines with every facet of our lives, the domain of writing is no exception. Traditional pen-and-paper narratives are being augmented and, in some instances, replaced by digital counterparts. With a surge in innovation, various apps have emerged, promising to ease the writing process and enrich the quality of content. But, as with all innovations, while they offer unprecedented advantages, they also come with their own set of challenges.

Modern writing tools encompass a vast spectrum—from basic word processors that mimic the age-old process of manual writing, to advanced AI-driven platforms that can draft entire documents based on a few keywords. These AI platforms, often taking the form of chatbots built on large language models (LLMs), promise to deliver content that is both relevant and coherent, simulating the nuances of human writing. However, their approach often follows a one-size-fits-all methodology, which can miss capturing the unique voice and intent of the individual writer.

While the thrill of getting an entire draft from a chatbot sounds enticing, it often throws writers into a passive role, distancing them from their original vision. Revisions, a cornerstone of the writing process, turn into a cumbersome ordeal, either making writers rewrite vast portions of AI-generated content or revert to demanding a complete rewrite from the bot. Furthermore, chatbots typically follow an "append-only" structure, which limits the dynamic editing and interactive capabilities that writers often seek.

As a result of these constraints, writers find themselves at a crossroads. On one hand, they have access to powerful AI tools that can significantly enhance productivity and inspiration. On the other, they risk losing the personal touch, authenticity, and intricate control over their craft. The available platforms, while useful, tend to box writers into specific workflows, stifling the fluidity and flexibility that the art of writing often demands.

With this backdrop, it becomes evident that while we have made leaps in integrating technology with writing, there is a tangible gap between what is available and what is truly desired and needed.

SUMMARY

Computer-implemented methods and systems interface with a language model (e.g., a Large Language Model (LLM)) to assist in document revision. The methods and systems allow text to be selected within a document and an action definition to be selected from an action definition library. The text and/or the action definition may be selected using a graphical user interface (GUI). An action defined by the selected action definition is applied to the selected text to generate text. For example, the selected action definition may include a prompt, and the prompt may be combined with the selected text to generate a combined prompt. The combined prompt may be provided as an input to the LLM, which may generate the generated text. The generated text may be integrated into the document.

Other features and advantages of various aspects and embodiments of the present invention will become apparent from the following description and from the claims.

DETAILED DESCRIPTION

Computer-implemented methods and systems interface with a language model (e.g., a Large Language Model (LLM)) to assist in document revision. The methods and systems allow text to be selected within a document and an action definition to be selected from an action definition library. The text and/or the action definition may be selected using a graphical user interface (GUI). An action defined by the selected action definition is applied to the selected text to generate text. For example, the selected action definition may include a prompt, and the prompt may be combined with the selected text to generate a combined prompt. The combined prompt may be provided as an input to the LLM, which may generate the generated text. The generated text may be integrated into the document.

Figure 1:
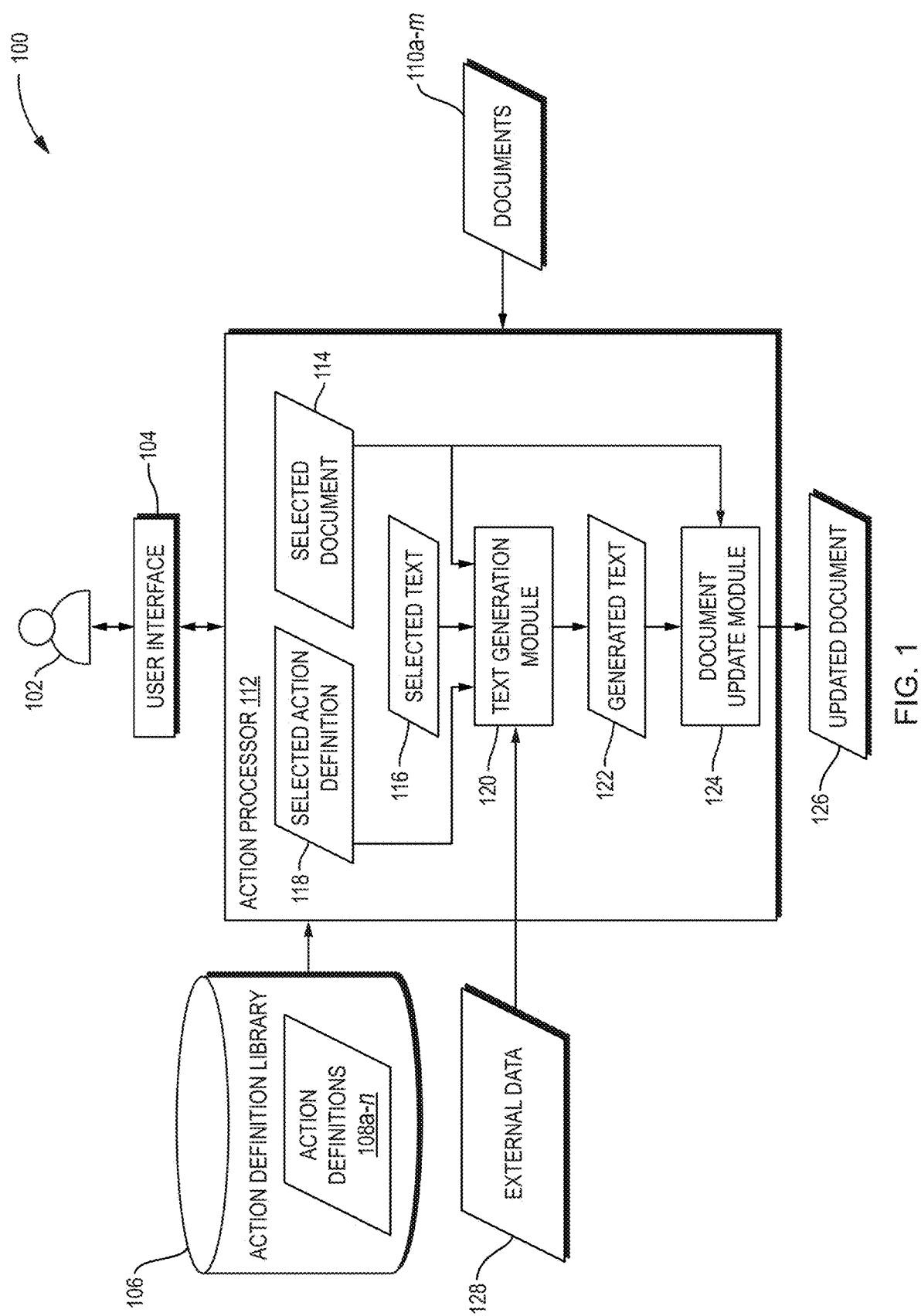
FIG. 1 is a dataflow diagram of a system for generating text based on a selected document, text, and action definition, and for updating the selected document based on the generated text according to one embodiment of the present invention.
Figure 2:
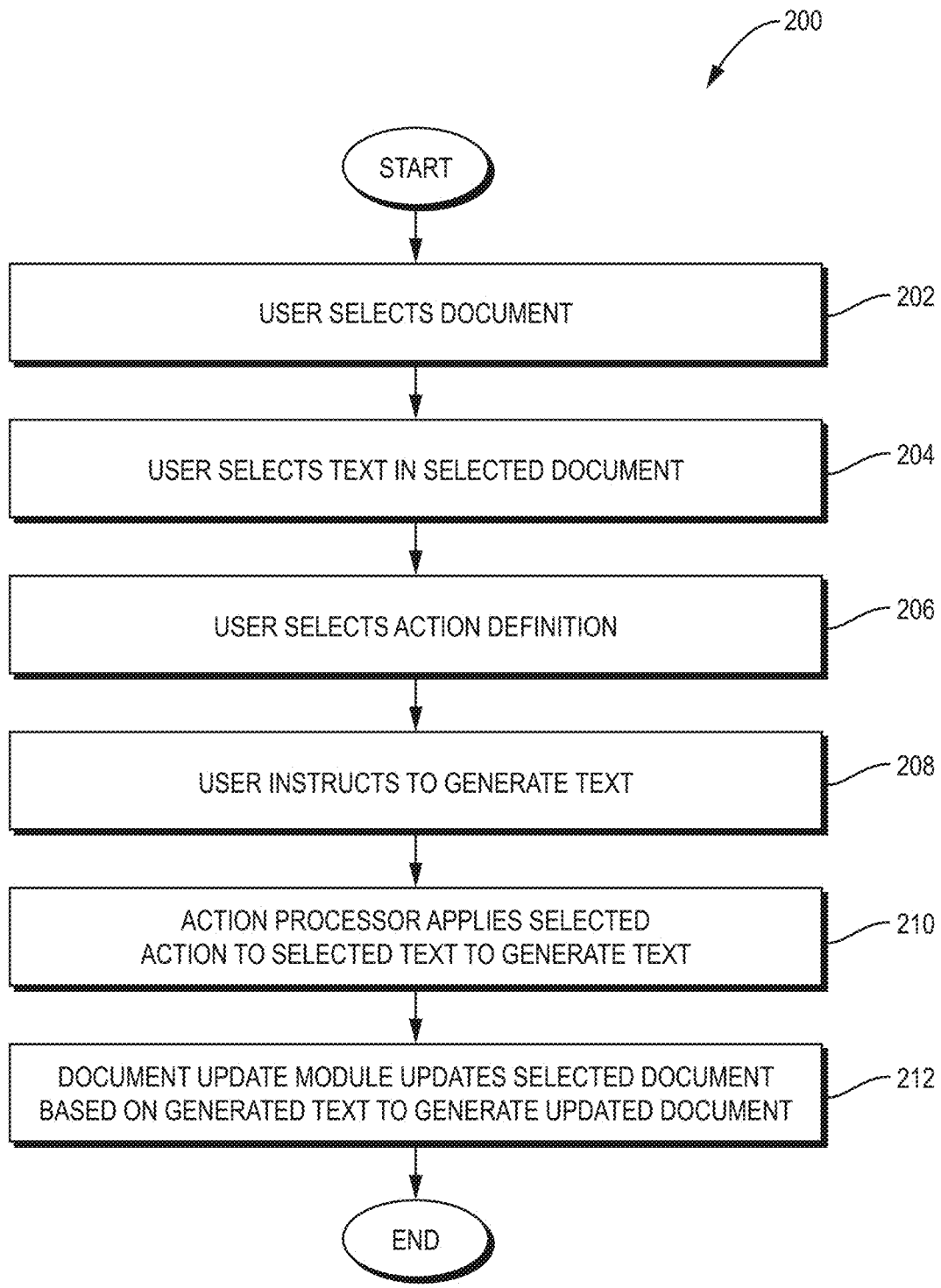
FIG. 2 is a flowchart of a method performed by the system of FIG. 1 according to one embodiment of the present invention.

Referring to FIG. 1, a dataflow diagram is shown of a system 100 for generating text based on a selected document, text, and action definition, and for updating the selected document based on the generated text according to one embodiment of the present invention. Referring to FIG. 2, a flowchart is shown of a method 200 performed by the system 100 of FIG. 1 according to one embodiment of the present invention.

The system 100 includes a user 102, who may, for example, be a human user, a software program, a device (e.g., a computer), or any combination thereof. For example, in some embodiments, the user 102 is a human user. Although only the single user 102 is shown in FIG. 1, the system 100 may include any number of users, each of whom may perform any of the functions disclosed herein in connection with the user 102. For example, the functions disclosed herein in connection with the user 102 may be performed by multiple users, such as in the case in which one user performs some of the functions disclosed herein in connection with the user 102 and another user performs other functions disclosed herein in connection with the user 102.

The system 100 also includes a user interface 104, which receives input from the user 102 and provides output to the user 102. The user interface 104 may, for example, include a textual interface (which may, for example, receive textual input from the user 102 and/or provide textual output to the user 102), a graphical user interface (GUI), a voice input interface, a haptic interface, an Application Program Interface (API), or any combination thereof. Although only the single user interface 104 is shown in FIG. 1, the system 100 may include multiple user interfaces, in which case some of the functions disclosed herein in connection with the user interface 104 may be performed by one user interface, and other functions disclosed herein in connection with the user interface 104 may be performed by another user interface.

Although the disclosure herein provides certain examples throughout of inputs that may be received from the user 102 via the user interface 104, such examples are merely provided as illustrations and do not constitute limitations of the present invention. It should be understood for example, that any particular example of an input from the user 102 that is in a particular mode (e.g., text input or interaction with a graphical element in a GUI) may alternatively be implemented by an input from the user 102 in a different mode (e.g., voice).

Because the user 102 may be non-human (e.g., software or a device), the user interface 104 may receive input from, and provide output to, a non-human user. As this implies, the user interface 104 is not limited to interfaces, such as graphical user interfaces, that are conventionally referred to as "user" interfaces. For example, if the user 102 is a computer program, the user interface 104 may provide receive input from and provide output to such a computer program using an interface, such as an API, that is not conventionally referred to as a user interface, and that may not even manifest any output to a human user or that is perceptible directly by a human user.

The term "manifest," as used herein, refers to generating any output to the user 102 via the user interface 104 in any form based on any data, such as any of the data shown in FIG. 1. The result of manifesting any particular data is referred to herein as a "manifestation" of that data. Manifesting data may include, for example, generating visual (e.g., textual, image, and/or video) output, audio output, and/or haptic output, in any combination. Therefore, any reference herein to generating output to the user 102 via the user interface 104 should be understood to include manifesting that output in any way, even if such a reference refers only to a particular kind of manifesting/manifestation (e.g., "displaying" or "showing" the output to the user 102).

The system 100 includes a plurality of documents 110a-m. Although the system 100 may include only a single document, the plurality of documents 110a-m is shown and described herein for the sake of generality. It should be understood, however, that features disclosed herein may be applied to a single document, rather than to the plurality of documents 110a-m.

The term "document" as used herein refers to any data structure that includes text. A document may, for example, be or be part of a file in a file system, a record, a database table, or a database. A document may include data in addition to text, such as audio and/or visual data.

The system 100 also includes an action processor 112. As will be described in more detail below, the action processor 112 may perform a variety of functions. Although the action processor 112 is shown as a single module in FIG. 1, this is merely an example and does not constitute a limitation of the present invention. More generally, any of the functions disclosed herein as being performed by the action processor 112 may be performed by any one or more modules in any combination, which may include, for example, one or more software applications. As merely one example, selection of text within a document by the action processor 112 may be performed by one software application or module (e.g., a word processing application), while generation of text by the action processor 112 may be performed by another software application or module (e.g., a plugin to the word processing application). As this example illustrates, some functions performed by the action processor 112 may be performed by or in cooperation with one or more conventional components (e.g., a conventional word processing application), while other functions performed by the action processor 112 may be performed by one or more non-conventional components that have been implemented in accordance with the disclosure herein.

The user 102 selects a particular document (referred to herein as the selected document 114) within the plurality of documents 110a-m (FIG. 2, operation 202). For example, the user 102 may provide document selection input to the action processor 112 via the user interface 104, in response to which the action processor 112 may select the selected document 114 from among the plurality of documents 110a-m. The user 102 may select the selected document 114 in any of a variety of ways, such as by opening the selected document 114 in any known manner (e.g., double-clicking on an icon representing the selected document 114 in a GUI) or by selecting a window displaying the selected document 114 in a GUI. Although the selected document 114 is shown as a distinct element in FIG. 1, the selected document 114 may be implemented using a pointer, reference, or other data that identifies the selected document 114 within the plurality of documents 110a-m or which otherwise enables the action processor 112 to perform the functions disclosed herein in connection with the selected document 114.

Operation 202 is optional in the method 200. For example, operation 202 may be omitted if there is only one document in the system 100, if the action processor 112 itself has already selected a document, or if the selected document 114 is implicit or automatically- selectable by the action processor 112 without the user 102's input. Furthermore, even if operation 202 is performed, it may, for example, be performed once to select the selected document 114, and then not be performed again during subsequent instances of the method 200, in which case the original selected document 114 may be used during each such instance without being re-selected.

The user 102 selects text (referred to herein as the selected text 116) within the selected document 114 (FIG. 2, operation 204). For example, the user 102 may provide text selection input to the action processor 112 via the user interface 104, in response to which the action processor 112 may select the selected text 116 within the selected document 114. The user 102 may select the selected text 116 in any of a variety of ways, such as by selecting the selected text 116 in any known manner (e.g., dragging across the selected text 116 within a manifestation of the selected document 114 in a GUI) or by typing or speaking some or all of the selected text 116. The selected text 116 may or may not be in the selected document 114 before the user 102 selects the selected text 116. As an example of the latter, the selected document 114 may not contain the selected text 116, and the user 102 may "select" the selected text 116 by inputting (e.g., typing or speaking) the selected text 116, such as by inputting the selected text 116 into the selected document 114 or elsewhere (e.g., into a text field that does not cause the selected text 116 to be added to the selected document 114).

The user 102 may select the selected text 116 in a variety of other ways, such as by uploading a file containing the selected text 116, selecting a file containing the selected text 116, pasting the selected text 116 from a clipboard, or sending a message (e.g., a text message or an email message) containing the selected text 116.

Although the selected text 116 is shown as a distinct element in FIG. 1, the selected text 116 may be implemented using a pointer, reference, or other data that identifies the selected text 116 within the selected document 114 or which otherwise enables the action processor 112 to perform the functions disclosed herein in connection with the selected text 116. For example, the selected text 116 may be implemented using any known techniques for representing selected text within a document in a word processing application or other text editing application.

The selected text 116 may consist of less than all of the text in the selected document 114. As some examples, the selected text 116 may consist of a single character in the selected document 114 (which may include multiple characters), a single word in the selected document 114 (which may include multiple words), a single sentence in the selected document 114 (which may include multiple sentences), or a single paragraph in the selected document 114 (which may include multiple paragraphs). As another example, the selected text 116 may include all of the text in the selected document 114. In any of these cases, the selected text 116 may include or consist of a single contiguous block of text in the selected document 114.

The selected text 116 may include or consist of a plurality of non-contiguous blocks of text (also referred to herein as "text selections") in the selected document 114, where each such text selection is contiguous within the selected document 114. For example, if the selected document 114 includes contiguous text blocks A, B, and C (i.e., if the selected document 114 includes text block A, followed immediately by text block B, followed immediately by text block C), then the selected text 116 may include text block A and text block C, but not text block B. The selected text 116 may implement such non-contiguous text selections using, for example, any known method for doing so. Similarly, the system 100 may enable the user 102 to select such non-contiguous text selections within the selected text 116 using, for example, any known method for doing so, such as by enabling the user to drag across a first such text selection in a manifestation of the selected document 114 in a GUI and then to drag across a second such text selection in the manifestation of the selected document 114 in the GUI while holding a predetermined key (e.g., CTRL or SHIFT).

The system 100 includes an action definition library 106, which may include one or a plurality of action definitions 108*a-n*.

The user 102 selects a particular action definition (referred to herein as the selected action definition 118) within the plurality of action definitions 108*a-n* (FIG. 2, operation 206). For example, the user 102 may provide action definition selection input to the action processor 112 via the user interface 104, in response to which the action processor 112 may select the selected action definition 118 from among the plurality of action definitions 108*a-n*. The user 102 may select the selected action definition 118 in any of a variety of ways, such as by selecting the selected action definition 118 from a manifested list of some or all of the action definitions 108*a-n* in any known manner (e.g., clicking or double-clicking on an icon representing the selected action definition 118 in a GUI) or by typing some or all of a label (e.g., short name) associated with the selected action definition 118. Although the selected action definition 118 is shown as a distinct element in FIG. 1, the selected action definition 118 may be implemented using a pointer, reference, or other data that identifies the selected action definition 118 within the plurality of action definitions 108*a-n* or which otherwise enables the action processor 112 to perform the functions disclosed herein in connection with the selected action definition 118.

As one particular example, the user 102 may select a manifestation of the selected text 116, and the action processor 112 may manifest a list of some or all of the plurality of action definitions 108*a-n*, such as in the form of a contextual menu. The action processor 112 may, for example, manifest such a list directly in response to the user 102's selection of the selected text 116, or in response to some additional input (e.g., right-clicking on the selected manifestation of the selected text 116) received from the user 102. The user 102 may then select one of the plurality of action definitions 108*a-n* from the list in any of the ways disclosed herein, thereby selecting the selected action definition 118. In response to that selection, or in response to some additional input from the user 102, the action processor 112 may perform operation 210.

More generally, the action processor 112 may perform operation 210 in connection with any kind of selected text 116 disclosed herein.

In some embodiments, operation 206 may be performed once to select the selected action definition 118, and then not performed again during subsequent instances of the method 200, in which case the original selected action definition 118 may be used during each such instance without being re-selected.

The action definitions 108*a-n* may not take a form that is amenable to being manifested in ways that are conducive to being understood easily or quickly by users, especially users who are not technically sophisticated. For example, as will be described in more detail below, the action definitions 108*a-n* may include scripts and/or LLM prompts. Embodiments may facilitate user input for selecting the selected action definition 118 in operation 206 in any of a variety of ways. For example, the action processor 112 may manifest, for each of some or all of the action definitions 108*a-n*, a corresponding action definition label (also referred to herein as an "action definition short name" or merely as a "short name") which contains less information than the corresponding action definition itself. For example, an action definition that includes an LLM prompt having 500 characters may have a short name that contains fewer characters (e.g., "Summarize" or "Rephrase"). The action processor 112 may, in operation 206, manifest only the short name of each manifested action definition and not the entire action definition. As an example, the action processor 112 may manifest a list (e.g., a menu or set of buttons) containing a plurality of short names corresponding to some or all of the action definitions 108*a-n*, such as "Summarize| Rephrase| Expand". As this example illustrates, different ones of the action definitions 108*a-n* may have different short names.

The user 102 may select the selected action definition 118 in operation 206 by providing input, via the user interface 104, to the action processor 112, which specifies the selected action definition 118. Such input may take any of a variety of forms. For example, the user 102 may provide that input by selecting the selected action definition 118 from a set of manifestations (e.g., short names) representing some or all of the action definitions 108*a-n*. For example, if the action processor 112 has manifested a plurality of manifestations of some or all of the action definitions 108*a-n* (e.g., in the form of a menu or a plurality of buttons), the user 102 may provide the input selecting the selected action definition 118 by selecting (e.g., clicking on, tapping on, or speaking a short name of) one of the plurality of manifestations which corresponds to the selected action definition 118.

In some embodiments, the user 102 may provide input selecting the selected action definition 118 in operation 206 even if the action processor 112 has not manifested any manifestations of the plurality of action definitions 108*a-n*. For example, the user 102 may select the selected text 116 and then provide input selecting the selected action definition 118 even if the action processor 112 has not manifested any manifestations of the plurality of action definitions 108a-n, such as by speaking or typing input that selects the selected action definition 118 (e.g., a short name of the selected action definition 118).

The user 102 instructs the action processor 112 to generate text that is referred to herein as the generated text 122 (FIG. 2, operation 208). The user 102 may provide this instruction by providing input, via the user interface 104, to the action processor 112, which instructs the action processor 112 to generate the generated text 122. Such input may take any of a variety of forms, such as speaking a voice command, typing a textual command, or providing any kind of input in connection with a GUI element, such as pressing a button or selecting a menu item.

In some embodiments, operation 208 may be omitted or combined with operation 206. For example, the action processor 112 may interpret the user 102's selection of the selected text 116 and/or the user 102's selection of the selected action definition 118 as an instruction to generate the generated text 122, or may otherwise generate the generated text 122 in response to the user 102's selection of the selected text 116 and/or the selected action definition 118, as a result of which the user 102 may not provide any distinct input instructing the action processor 112 to generate the generated text 122. For example, in response to the user 102 selecting the selected text 116 and selecting a short name of one of the action definitions 108a-n, the action processor 112 may generate the generated text 122 (operation 208) without receiving any additional input from the user 102 representing an instruction to generate the generated text 122.

In some embodiments, operation 208 may be performed once to receive an instruction from the user 102 to generate the generated text 122, and then not be performed again during subsequent instances of the method 200. For example, if the selected document 114 and the selected action definition 118 have been selected, the user 102 may provide input, via the user interface 104, to the action processor 112, instructing the action processor 112 to enter an "action mode." While in the action mode, the action processor 112 may, in response to any text in the selected document 114 being selected as an instance of the selected text 116, perform an action represented by the selected action definition 118 on that instance of the selected text 116 to generate a corresponding instance of the generated text 122, without the user 102 providing an instruction to generate each such instance of the generated text 122. Such an action mode enables the user to select the selected document 114 and selected action definition 118 once, and then to apply an action represented by the selected action definition 118 to a plurality of instances of the selected text 116 in the selected document 114 quickly and easily, without having to select the selected action definition 118 each time and without having to issue an instruction to perform an action represented by the selected action definition 118 each time.

Although certain operations are shown in a particular order in the method 200 of FIG. 2, this order is merely an example and does not constitute a limitation of the present invention. Operations in the method 200 may be performed in other orders. As some examples:

The user 102 may select the selected text 116 (operation 204) after selecting the selected action definition 118 (operation 206).

The user 102 may select the selected action definition 118 before selecting the selected text 116 (operation 204).

The user 102 may select the selected action definition 118 before selecting the selected text 116 (operation 202).

The system 100 includes a text generation module 120, which applies an action defined by the selected action definition 118 (referred to herein as the "selected action" or a "corresponding action" of the selected action definition 118) to the selected text 116 to generate the generated text 122 (FIG. 2, operation 210). The generated text 122 may include at least some text that is not in the selected text 116. For example, none of the text in the generated text 122 may be in the selected text 116. As another example, the generated text 122 may include some text that is in the selected text 116 and some text that is not in the selected text 116. For example, if the selected text 116 includes text A followed immediately by text B, the generated text 122 may include text A followed immediately by text C, where text B differs from text C. As another example, if the selected text 116 includes text A followed immediately by text B, the generated text 122 may include text C followed immediately by text B, where text A differs from text C. The generated text 122 may include (e.g., consist of) text that is not in the selected document 114.

The system 100 may also include a variety of external data 128. The external data may be external in the sense that it is not contained in the documents 110a-m or in the selected document 114. The external data 128 may, however, be contained within the action processor 112 and/or be outside the action processor 112. The external data 128 may, for example, include data stored in any combination of the following: one or more data structures, files, records, databases, and/or websites. The external data 128 may include static data and/or dynamically-generated data, such as data that is generated dynamically in response to a request from the system 100 (e.g., the action processor 112).

The text generation module 120 may receive some or all of the external data 128 as input and apply the action corresponding to the selected action definition 118 to both the selected text 116 and to some or all of the external data 128. For example, as described in more detail below, the text generation module 120 may modify and/or generate a prompt based on the external data 128, such as by including some or all of the external data 128 in the prompt (e.g., by using some or all of the external data 128 as a value for one or more tokens in the prompt). As another example, the text generation module 120 may include some or all of the external data 128 in the generated text 122, whether or not the text generation module 120 includes that data in a prompt that is used to generate the generated text 122. As an example, the text generation module 120 may use a prompt (which does not include any of the external data 128) to generate the generated text 122 and then update the generated text 122 based on some or all of the external data 128, such as by including some or all of the external data 128 in the generated text 122.

The system 100 may utilize Retrieval Augmented Generation (RAG) to enhance its ability to generate and process text. RAG is a technique that combines the power of large language models with the ability to retrieve and incorporate relevant information from external sources. For example, when creating a prompt based on the selected text 116 and the selected action definition 118, the text generation module 120 may use RAG to retrieve relevant information from the documents 110a-m and/or external data 128. The text generation module 120 may incorporate such retrieved information incorporated into the prompt to provide additional context or guidance to the language model.

As another example, when processing the output generated by the text generation module 120 (e.g., the generated text 122), the text generation module 120 may use RAG to fact-check, augment, and/or refine such output based on information retrieved from trusted sources. The results of such processing may be used to modify the generated text 122 before providing the generated text 122 as output to the user 102. As yet another example, the document update module 124 updates the selected document 114 based on the generated text 122, the document update module 124 may use RAG to ensure consistency with other parts of the document or to incorporate relevant information from related documents.

RAG is merely one example of a variety of techniques that the system 100 may use to improve the output of language models, such as for the purpose of making the generated text 122 as relevant to the user 102 as possible. These techniques aim to customize and enhance the operation of language models to better suit the specific needs of the user 102 and the context of the document being edited. Some examples of such techniques include:

Fine-tuning: The system 100 may use fine-tuned language models that have been further trained on domain-specific data or the user 102's own writing style. The system 100 itself may perform such fine-tuning.

Few-shot learning: By providing the language model with a few relevant examples within the prompt, the system 100 can guide the model to generate more appropriate and contextually relevant text.

LARA (Light and Anti-overfitting Retraining Approach): The system 100 may employ LARA to fine-tune language models in a way that reduces overfitting and maintains the model's general knowledge while adapting it to specific tasks or domains. This can help produce more reliable and contextually appropriate generated text 122.

Prompt engineering: The system 100 may employ advanced prompt engineering techniques, such as chain-of-thought prompting or self-consistency, to elicit more coherent and relevant responses from the language model.

Ensemble methods: The system 100 may combine outputs from multiple language models or multiple runs of the same model to produce more robust and diverse generated text 122.

Context windowing: For longer documents, the system 100 may use sliding context windows to provide the language model with the most relevant surrounding text, ensuring that the generated text 122 maintains coherence with the broader document.

These techniques, either individually or in combination, may be applied by the text generation module 120 and the system 100 more generally to enhance the relevance and quality of the generated text 122. The specific techniques used may depend on factors such as the selected action definition 118, the nature of the selected document 114, and user preferences.

The system 100 includes a document update module 124, which updates the selected document 114 based on the generated text 122 to generate an updated document 126 (FIG. 2, operation 212). The document update module 124 may perform operation 212 in any of a variety of ways. For example, the document update module 124 may perform operation 212 by:

replacing the selected text 116 in the selected document 114 with the generated text 122;

modifying the selected text 116 in the selected document 114 based on the generated text 122; or adding the generated text 122 to the selected document 114, without modifying the selected text 116 in the selected document 114.

As the above implies, as a result of operation 212, the updated document 126 may include some or all of the generated text 122, even if the selected document 114 did not include the generated text 122.

The system 100 may enable the user 102 to select the update mode of the document update module 124 from among a plurality of update modes (e.g., from the "replace," "modify," and "add" modes described above). This feature allows the user 102 to choose how the generated text 122 will be integrated into the selected document 114.

To implement such a user-selectable document update mode, the system 100 may receive document update mode selection input from the user 102, e.g., via the user interface 104. As one example, the system 100 may manifest output, via the user interface 104, representing a plurality of available document update modes, and the user 102 may provide document update mode selection input selecting one of the available document update modes (the "selected document update mode"). At any later time, the document update module 124 may perform operation 212 using the selected document update mode.

As another example, the action definitions 108a-n in the action definition library 106 may include a parameter specifying the default update mode for each action definition. The user 102 may be able to override this default setting when selecting an action definition. In any case, when the document update module 124 performs operation 212, the document update module 124 may identify the update mode (e.g., the default update mode or user-overridden update mode) associated with the selected action and perform operation 212 using the identified update mode. As yet another example, the system 100 may include a global setting that determines the default update mode, which the user 102 can override, such as by using a settings menu in the user interface 104. In any case, when the document update module 124 performs operation 212, the document update module 124 may identify the system-wide update mode (e.g., the default system-wide update mode or user-overridden system-wide update mode) and perform operation 212 using the identified update mode.

The document update module 124 may perform operation 212 directly or indirectly on the selected document 114 in any of a variety of ways. For example, the document update module 124 may directly update the selected document 114 in any of the ways disclosed herein to generate the updated document 126, which may be an updated version of the selected document 114, such as in embodiments in which the user 102 edits the selected document 114 in a software application via the user interface 104, and in which the document update module 124 has direct access to the selected document 114. Alternatively, for example, the document update module 124 may provide output (not shown), which specifies modifications to be made to the selected document 114, to another component (not shown), such as a text editing application (e.g., word processing application), which has direct access to the selected document 114, in which case that other component (e.g., text editing application) may update the selected document 114 in the manner specified by the output from the document update module 124 to generate the updated document 126.

Although the updated document 126 is shown distinctly from the selected document 114 in FIG. 1 for ease of illustration, the updated document 126 may be an updated version of the selected document 114, such that no document separate from the selected document 114 is generated by operation 212. Alternatively, for example, operation 212 may generate the updated document 126 as a document that is distinct from the selected document 114, such that, as a result of operation 212, the selected document 114 and the updated document 126 both exist simultaneously (e.g., as distinct documents in a file system), and the selected document 114 may remain unchanged by operation 212.

Regardless of how operation 212 is performed, once the updated document 126 has been generated, the user interface 104 may generate manifest some or all of the updated document 126, thereby generating a manifestation of the updated document 126, which may be provided to the user 102 via the user interface 104. For example, the user interface 104 may manifest (e.g., display) some or all of a portion of the updated document 126 containing the generated text 122 to the user 102.

As mentioned above, operation 212 may include inserting some or all of the generated text 122 into the selected document 114. More generally, the action processor 112 may identify a location (referred to herein as "the selected output location"), whether in the selected document 114 or in another one of the documents 110a-m, and insert the generated text 122 at the selected output location, or otherwise update the selected document 114 at the selected output location based on the generated text 122. The action processor 112 may identify the selected output location in any of a variety of ways, such as automatically or by receiving input from the user 102 via the user interface 104, which specifies the selected output location.

The action processor 112 may receive such input from the user 102 specifying the selected output location in any of a variety of ways. For example, the user 102 may specify the selected output location, such as by clicking or tapping on a manifestation of the selected output location (e.g., in a manifestation of the selected document 114 or another one of the documents 110a-m). The user 102 may provide input specifying the selected output location at any of a variety of times, such as before operation 202; after operation 202 and before operation 204; after operation 204 and before operation 206; after operation 206 and before operation 208; after operation 208 and before operation 210; or after operation 210 and before operation 212. As a particular example, the action processor 112 may perform operation 210 to generate the generated text 122 and then receive input from the user 102 specifying the selected output location. The action processor 112 may, for example, manifest a preview of the updated document 126 to the user 102, showing how the updated document 126 would appear if it were updated based on the user 102's selected output location, and enable the user 102 to accept or reject that version of the updated document 126. If the user 102 rejects that version of the updated document 126, the system 100 may enable the user 102 to select an alternative selected output location, in response to which the action processor 112 may manifest a preview of the updated document 126 to the user 102 based on the alternative selected output location and repeat the process just described. This process may repeated any number of times until the user 102 accepts an output location, at which point the latest version of the updated document 126 is output by the action processor 112 in operation 212.

The selected output location may, but need not be, within the selected document 114 or within any of the documents 110a-m. As another example, the selected output location may be in a new document/window/panel, in which case the action processor 112 may, as part of or after operation 212, generate a new document/window/panel and insert the generated text 122 into the new document/window/panel, which is an example of the updated document 126.

In some embodiments, the document update module 124 uses a language model (e.g., a large language model (LLM)) in the performance of operation 212. For example, each of some or all of the action definitions 108a-n may include, refer to, or otherwise specify one or more corresponding prompts suitable for being provided as input to a language model. Different ones of the action definitions 108a-n may include, refer to, or otherwise specify different corresponding prompts. For any particular action definition, the prompt(s) that the particular action definition includes, refers to, or otherwise specifies is referred to herein as the particular action definition's "corresponding prompt" (even if there are a plurality of such prompts). The selected action definition 118 may have a particular corresponding prompt. Applying the selected action definition 118 to the selected text 116 may include, for example, providing the selected action definition 118's corresponding prompt as an input to a language model to generate some or all of the generated text 122, or otherwise to generate output which the action processor 112 processes to generate some or all of the generated text 122 (whether or not the generated text 122 includes any of the output of the language model).

Before providing input to a language model, the action processor 112 may, for example, generate a prompt based on the selected action definition 118 and the selected text 116 (and, optionally, the selected document 114 and/or the external data 128). Although more examples of how the action processor 112 may generate such a prompt will be described in more detail below, the action processor 112 may, for example, generate a prompt (referred to herein as a "combined prompt") which includes both some or all of the selected action definition 118's corresponding prompt and some or all of the selected text 116, such as by concatenating the selected action definition 118's corresponding prompt with some or all of the selected text 116. As a particular example, the combined prompt may include or consist of the selected action definition 118's corresponding prompt followed immediately by the selected text 116, or the selected text 116 followed immediately by the selected action definition 118's corresponding prompt. The action processor 112 may provide such a combined prompt to a language model to generate output (e.g., the generated text 122) in any of the ways disclosed herein.

More generally, the action processor 112 may perform any of a variety of actions to generate the combined prompt based on the select action definition 118's corresponding prompt and (optionally) additional data, such as any one or more of the selected text 116, the selected document 114, the 110a-m, or the external data 128. As described in more detail below, the actions that the action processor 112 performs to generate the combined prompt may include one or more actions other than "combining" the selected action definition 118's corresponding prompt. As a result, although the resulting prompt is referred to herein as the "combined prompt," this prompt may also be understood as a "processed prompt" or "final prompt," meaning that it results from processing the selected action definition 118's corresponding prompt and (optionally) additional data, whether or not such processing is characterizable as "combining" the selected action definition 118's corresponding prompt with other information. Merely one example of such processing is to use a trained model, such as an LLM, to generate the combined prompt based on the selected action definition 118's corresponding prompt and (optionally) additional data.

As implied by the description herein, embodiments of the system 100 may enable the user 102 to cause the action processor 112 to provide the combined prompt to the language model without the user 102 typing or otherwise inputting the combined prompt (or at least the entirety of the combined prompt) to the action processor 112. The action processor 112 may not even manifest the combined prompt (or at least the entirety of the combined prompt) to the user 102. For example, the user 102 may select the selected text 116 and select a short name of the selected action definition 118, which may contain only a small amount of text (e.g., "Summarize"), without inputting (e.g., typing or speaking) the corresponding prompt of the selected action definition 118 (which may contain a large amount of text that is not manifested by the action processor 112 to the user 102), and thereby cause the action processor 112 to: (1) generate a combined prompt based on the corresponding prompt of the selected action definition 118 and the selected text 116; (2) provide the combined prompt as input to a language model to generate output (e.g., the generated text 122); and (3) generate the updated document 126 based on output (e.g., the generated text 122) generated by the language model. Such a process enables the user 102 to leverage the power of a language model to generate the generated text 122, and to generate the updated document 126 based on the generated text 122, without having to manually create or input a prompt to the language model based on the selected text 116, and without having to manually update the selected document 114 based on the output of the language model. Instead, the action processor 112 may perform these operations automatically, thereby not only saving the user 102 manual time and effort, but also increasing the processing efficiency of the system 100 as a whole by enabling it to generate the generated text 122 and to generate the updated document 126 in fewer operations, and more quickly, than would be possible using a conventional chatbot-based approach.

Any language model referred to herein may be of any type disclosed herein. Any language model referred to herein may be contained within the system 100 (e.g., within the action processor 112) or be external to the system 100 (e.g., external to the action processor 112), in which case the system 100 (e.g., the action processor 112) may provide input to and receive output from the language model using a suitable interface, such as an API.

Although the disclosure herein may refer to "a language model," it should be understood that embodiments of the present invention may use a plurality of language models. As a result, any disclosure herein of performing multiple operations using a language model (e.g., generating a first instance of the generated text 122 using a language model and generating a second instance of the generated text 122 using a language model) should be understood to include either using the same language model to perform those multiple operations or to using different language models to perform those multiple operations. Embodiments of the present invention may select a particular language model to perform any operation disclosed herein in any suitable manner, such as automatically or based on input from the user 102 which selects a particular language model for use.

Any language model disclosed herein may (unless otherwise specified) include one or more language models, such as any one or more of the following, in any combination:
 a unigram language model;
 an n-gram language model;
 an exponential language model;
 a generative language model;
 an autoregressive language model; and
 a neural network language model.

Any language model disclosed may, unless otherwise specified, include at least 1 billion parameters, at least 10 billion parameters, at least 100 billion parameters, at least 500 billion parameters, at least 1 trillion parameters, at least 5 trillion parameters, at least 25 trillion parameters, at least 50 trillion parameters, or at least 100 trillion parameters.

Any language model disclosed herein may, unless otherwise specified, have a size of a least 1 gigabyte, at least 10 gigabytes, at least 100 gigabytes, at least 500 gigabytes, at least 1 terabyte, at least 10 terabytes, at least 100 terabytes, or at least 1 petabyte.

Any language model disclosed herein may, for example, include one or more of each of the types of language models above, unless otherwise specified. As a particular example, any language model disclosed herein may, unless otherwise specified, be or include any one or more of the following language models, in any combination:
 Any language model in the GPT-n series of language models (such as any language model in the GPT-1, GPT-2, GPT-3, or GPT-4 families) available from OpenAI Incorporated of San Francisco, California;
 any version of the Language Model for Dialogue Applications (LaMDA), Generalist Language Model (GLaM), Pathways Language Model (PaLM), or Gemini, available from Google LLC of Mountain View, California;
 any version of the Gopher language model, available from DeepMind Technologies of London, United Kingdom;
 any version of the Turing-NLG (Turing Natural Language Generation) language model, available from Microsoft Corporation of Redmond, Washington;
 any version of the Megatron Language Model (Megatron-LM), available from Nvidia Corporation of Santa Clara, California; and
 any version of the Large Language Model Meta AI (LLaMA), available from Meta Platforms, Inc. of Menlo Park, California.

The action definitions 108a-n may take any of a variety of forms, some of which will now be described. Different ones of the action definitions 108a-n may be of different types. In other words, the types of action definitions 108a-n disclosed herein may be mixed and matched within the action definition library 106. Any particular embodiment of the present invention may implement some or all of the action definition types disclosed herein. Types of action definitions 108a-n may include, for example, any one or more of the following, in which the examples of prompts and user interfaces are merely examples and do not constitute limitations of embodiments disclosed herein:
 Simple Text Prompts:
  Description: These are plain text prompts with no dynamic content (e.g., tokens or scripts). Examples are: "Expand on the following text:", "Summarize the following text:", and "Rewrite the following text to be understandable by a five year-old:".
  UI/UX Approach: Each simple text prompt may, for example, be displayed as a corresponding UI element (e.g., list item or button) with a distinct label, such as the corresponding action definition's short name. Clicking such a UI element causes the corresponding action definition to be selected as the selected action definition 118.
  Selection: Single-click.

Viewing: Hovering over the UI element may display a tooltip with details (e.g., a description of the corresponding prompt and/or the full text of the corresponding prompt).

Editing: Right-click or a small adjacent "edit" icon opens a simple text box, which enables the user 102 to edit the corresponding prompt and then save the edits.

Tokenized Prompts:
Description: Prompts that contain placeholders (tokens) that can be dynamically replaced with content from any of a variety of sources, such as the selected text 116, the selected document 114, the documents 110a-m, input from the user 102 via the user interface 104, and/or external data 128.

UI/UX Approach: Displayed similarly to simple text prompts, but with indications (e.g., colored/italicized) to suggest dynamic content.

Selection: Single-click.

Viewing: Tokens highlighted or underlined. Hovering over them shows a tooltip with details.

Editing: Clicking on the token allows the user to select an alternative or input their own.

Alternative Take Prompts (an example of "compound prompts"):
Description: Multiple prompts, bundled in one prompt, representing alternatives for producing varied outputs. Each prompt within an alternative take prompt is an example of what is referred to herein as a "component prompt." Each component prompt within an alternative take prompt may be of any of the prompt types disclosed herein (e.g., simple, tokenized, compound, or scripted). When the action processor 112 executes an alternative take prompt, the action processor 112 performs operation 210 once for each of some or all of the alternative take prompt's component prompts in connection with the selected text 116, thereby generating a plurality of instances of the generated text 122 (one for each of some or all of the alternative take prompt's component prompts). The action processor 112 then enables the user 102 to select one or more of the plurality of instances of the generated text 122, in response to which the action processor 112 performs operation 212 on each instance of the generated text 122 selected by the user 102.

UI/UX Approach: Displayed as a dropdown or expandable list.

Selection: Clicking the compound prompt reveals components.

Viewing: Expandable sections allow users to see each alternative.

Editing: Users can add, remove, or modify each component prompt.

Chained Prompts (an example of "compound prompts"):
Description: Multiple prompts, bundled in one prompt, which are sequenced to execute in a specific order. Each prompt within a chained prompt is an example of a component prompt. Each component prompt within a chained prompt may be of any of the prompt types disclosed herein (e.g., simple, tokenized, compound, or scripted). When the action processor 112 executes a chained prompt, the action processor 112 performs operation 210 on the first of the chained prompt's component prompts in connection with the selected text 116, thereby generating a first instance of the generated text 122. The action processor 112 then performs operation 210 again, but uses the first instance of the generated text 122 to play the role of the selected text 116, thereby generating a second instance of the generated text 122. In other words, the action processor 112 uses the output of one instance of operation 210 as an input to the next instance of operation 210. This continues for all of the chained prompt's component prompts in order, at which point the most recent instance of the generated text 122 is used as the generated text 122 in operation 212.

UI/UX Approach: Displayed as a list with visual indications of the sequence (numbers/arrows).

Selection: Single-click to apply the sequence.

Viewing: Steps could be expandable or displayed with details on hover.

Editing: Drag-and-drop for rearranging. Individual step editing similar to simpler prompt types.

Scripted Prompts:
Description: Prompts, written in a scripting language, which may contain any one or more of the following, in any combination: prompts of any of the types disclosed herein, conditions, loops, and multifaceted logic. A scripted prompt may include at least one instruction to apply a corresponding action of the selected action definition 118 to the selected text 116, and may include: any number of instructions that perform actions other than the corresponding action of the selected action definition 118; and any number of instructions that perform actions that do not apply to the selected text 116. More generally, a scripted prompt may include instructions for performing any arbitrary action, whether or not related to the selected document 114, the selected text 116, or the selected action definition 118. As this implies, if the selected action definition 118 includes or otherwise specifies a scripted prompt, then operation 210 may include executing the script in that scripted prompt. As this implies, operation 210 is not limited to providing a prompt as input to a language model, but may include executing a script, which may include performing operations other than providing a prompt as input to a language model and operations other than performing inferencing using a language model.

UI/UX Approach: These may, for example, be represented with unique icons or visuals to distinguish their complexity.

Selection: Single-click, but with warnings or confirmations due to their complexity.

Viewing: A dedicated "view mode" that expands the script in a readable, perhaps even flowchart-like format.

Editing: A specialized script editor, potentially with hints, autofill, or predefined logic blocks to assist less technically inclined users.

What is described herein as an "alternative take prompt" may be implemented in any of a variety of ways. For example, a plurality of component prompts may be stored within a single action definition, in which case the action processor 112 may perform operation 210 once for each of some or all of the plurality of stored component prompts. As another example, the system 100 may enable the user 102 to select a plurality of component prompts using any of the techniques disclosed herein for selecting the selected action definition 118. The action processor 112 may perform operation 210 once for each of the plurality of component prompts selected by the user 102, whether or not those component prompts are stored within an action definition or the action definition library 106. Such an "on the fly" or "one time use" alternative take prompt may provide the user 102 with convenience and flexibility in executing alternative take prompts without the need to define and store such prompts in the action definition library 106 in advance.

An alternative take prompt may be implemented by executing even a single instance of the selected action definition 118, in any of the ways disclosed herein, a plurality of times to produce a plurality of instances of the generated text 122. Such instances of the generated text 122 may differ from each other because, for example, of the stochastic nature of LLMs and other models that may be used by the text generation module 120 to perform operation 210. As this example illustrates, an alternative take prompt may, but need not, include a plurality of prompts in order to achieve the effect of alternative takes.

The system 100 may handle the multiple outputs generated by an alternative take prompt in at least two different ways. As another example, the system 100 may provide all of the outputs to the user 102 for review via the user interface 104. The user 102 may then select one or more of these outputs, and the system 100 may use the selected output(s) to update the selected document 114 in operation 212. This approach allows for maximum user control and decision-making in the document revision process.

Alternatively, for example, the text generation module 120 may process the plurality of outputs generated using an alternative take prompt internally to produce a single instance of the generated text 122. The text generation module 120 may employ various methods to process multiple outputs internally, such as any one or more of the following:

- Concatenation: The text generation module 120 may combine all outputs sequentially to create a single, comprehensive instance of the generated text 122.
- Best Output Selection: The text generation module 120 may use one or more predefined criteria or machine learning algorithms to evaluate and select the "best" output among the alternatives. This may, for example, be based on factors such as relevance, coherence, or alignment with the user 102's writing style.
- Synthesis: The text generation module 120 may analyze the multiple outputs and create a new, synthesized text that incorporates the most relevant and/or high-quality elements from each alternative.
- Voting or Consensus: If the alternative take prompt generates similar ideas across multiple outputs, the text generation module 120 may identify common themes or phrases and construct a single output based on the most frequently occurring elements.

Any of the methods described above for generating a single instance of the generated text 122 based on multiple outputs of an alternative take prompt may, for example, include using a language model (e.g., an LLM) to generate that single instance of the generated text 122.

The method for handling multiple outputs of an alternative take prompt may, for example, be configured as a system-wide setting, specified within individual action definitions, or selected by the user 102 on a case-by-case basis through the user interface 104. This flexibility allows the system 100 to adapt to different user preferences and document revision scenarios, maintaining a balance between automated efficiency and user control.

As the types of prompts disclosed above illustrate, the text generation module 120 may act as a function which takes the selected text 116 as an input to the function, and which evaluates the function on the selected text 116 to generate the generated text 122. Such a function may have, as inputs, not only the selected text 116 but also one or more other inputs, such as any of the other values disclosed herein. For example, the selected text 116 may include or consist of a plurality of non-contiguous text selections in the selected document 114. Each of those non-contiguous text selections may be inputs to a single function that is evaluated by the text generation module 120 to generate the generated text 122. As a particular example, if a tokenized prompt includes two tokens, then a first of the text selections in the selected text 116 may serve as the value for a first one of the two tokens in the tokenized prompt, and a second one of the text selections in the selected text 116 may serve as the value for a second one of the two tokens in the tokenized prompts. The text generation module 120 may generate the generated text 122 based on the resulting tokenized prompt (with the first and second text selections substituted into it).

As used herein, the term "prompt" includes not only prompts that are suitable to be provided to a language model, but more generally to any kind of action definition described herein, whether or not such an action definition includes or consists of content (e.g., text) that is suitable for being provided to a language model.

As mentioned above, a tokenized prompt may include one or more tokens. Similarly, a compound prompt or scripted prompt may include one or more tokens. Any particular prompt may include one or more tokens of any type(s), in any combination. Examples of token types include the following:

Selected Text Token:
- Represents the selected text 116.
- An example of a prompt that includes a selected text token is: "Summarize the following text: {selected_text}."

Contextual Tokens:
- Pulls from a broader context within or related to the selected document 114, such as the paragraph before/after the selected text, a specified portion (e.g., sentence, paragraph, or section) of the selected document 114, a specified feature (e.g., title) of the selected document 114, or specified metadata (e.g., creation date, last modified date, owner) of the selected document 114.
- An example of a prompt that includes a contextual token is: "Considering the following: {previous_paragraph}, elaborate on {selected_text}."

Date & Time Tokens:
- Automatically fetches a date and/or time, such as the current date and/or time.
- An example of a prompt that includes a date and time token is: "In the context of {selected_text}, what have been its impacts until {today}?"

User Profile Tokens:
- Refers to user's stored information, such as name, preferences, or writing style.
- An example of a prompt that includes a user profile token is: "Rephrase {selected_text} in the following writing style: {user_writingstyle}."

Document Metadata Tokens:
- Refers to metadata of the selected document 114 and or the documents 110*a-m,* such as document title, author, or word count. Such metadata may, for example, include any metadata that may be defined, generated, and accessed via a Document Object Model (DOM) or similar structure(s) that represent document data and metadata in an accessible and modifiable form.

An example of a prompt that includes a document metadata token is: "Incorporate {selected_text} into the theme of {document_title}."

Genre/Style Tokens:
Offers a tone or style shift based on genres such as humor, academic, journalistic, or romance.

An example of a prompt that includes a user genre/style token is: "Rewrite {selected_text} in a {genre} tone."

Reference Tokens:
For cases where users want to correlate selected text with external references or sources.

An example of a prompt that includes a reference token is: "Compare {selected_text} with known literature on {reference_topic}."

Numeric Tokens:
For representing specific numbers or numerical ranges.

An example of a prompt that includes a numeric token is: "Summarize {selected_text} in no more than {max_words} words."

Language Tokens:
For representing identifiers of particular languages.

An example of a prompt that includes a language token is: "Translate {selected_text} into {specified_language}."

Location Tokens:
Refers to specific locations or regions, potentially useful for location-based content.

An example of a prompt that includes a location token is: "Adapt {selected_text} for an audience in {specified_location}."

Historical/Temporal Tokens:
For referencing specific historical periods or future predictions.

An example of a prompt that includes a historical/temporal token is: "How might {selected_text} have been written in the {specified_era}?"

Feedback Loop Tokens:
A token that allows users to refer to previous outputs or iterations in the current session/chat/iteration of the method 200.

An example of a prompt that includes a feedback loop token is: "Considering my last request, refine {selected_text}."

Emotion Tokens:
Adjusts content based on specified emotions or feelings.

An example of a prompt that includes an emotion token is: "Describe {selected_text} in a {mood} mood."

As the above examples of token types imply, embodiments of the present invention may employ any of a wide variety of token types. A token may appear at any location within a prompt. For example, a token may appear after an instance of plain text in the prompt, before an instance of plain text in the prompt, or between two instances of plain text in the prompt. As another example, two tokens may appear contiguously within a prompt. As these examples indicate, a prompt may include plain text and tokens in sequences such as "<token><plaintext>", "<plaintext><token>", "<token><plaintext><token>", "<plaintext><token><plaintext>", "<token><token>", or "<plaintext><token><token>", merely as examples. The user 102 may use any of the techniques disclosed herein to insert one or more tokens at any desired location(s) within a prompt. These features of tokens are applicable not only to the "tokenized prompt" action definition type disclosed herein, but to any type of action definition that is capable of including one or more tokens.

When performing operation 210, the action processor 112 may, for each token in the prompt to be provided as input to the language model, obtain a value for that token and replace the token with the obtained value in the prompt. The action processor 112 may then provide the resulting resolved prompt (which is an example of a "combined prompt" as that term is used herein) to the language model in operation 210.

In addition to simple tokens that are replaced with a single value, the system 100 may support tokens with multiple replaceable parameters. These multi-parameter tokens allow for more complex and flexible token replacement within prompts. A multi-parameter token may take the following general form:

{token_name(param1, param2, . . . , paramN)}
where "token_name" is the identifier for the token, and "param1" through "paramN" are individual parameters that can each be replaced with their own values.

For example, a date range token might look like this:
{date range(start date, end date, format)}

When processing such a token, the text generation module 120 may replace each parameter with its corresponding value. The action processor 112 may obtain values for each parameter using any of the methods described for single-value tokens, including automatic retrieval, user input, or derivation from other data sources.

The action processor 112 may obtain such token values in any of a variety of ways. For example, the action processor 112 may obtain a value of any particular token automatically, such as by using any of a variety of known techniques. For example, certain tokens, such as the user's preferred genre, may be stored in a variable of a data structure, from which the action processor 112 may retrieve the token's value automatically. As another example, certain tokens, such as a token representing the current date, may have values that the action processor 112 may obtain by executing a function associated with the token. As another example, the action processor 112 may generate a token's value using a trained model, such as a large language model (LLM). The model used to generate a token's value may be the same as or different from the model used by the text generation module 120 to generate the generated text 122. Once the action processor 112 has obtained or generated the token's value, it may substitute the token with the resulting value.

As yet another example, certain tokens may be designated as having a "manual input" property, while other tokens may be designated as having an "automatic input" property. A single prompt may include both one or more "manual input" tokens and one or more "automatic input" tokens. When the action processor 112 encounters a token that has the manual input property in operation 210, the action processor 112 may elicit input from the user 102, such as by displaying a popup window or dialog box requesting a value for the token from the user 102. In response, the user 102 may provide input representing or otherwise specifying such a value in any manner (such as by typing, speaking, or selecting such a value from a list). The action processor 112 may then use the value received from the user 102 as the value for the token, or may derive a value for the token from the value received from the user 102, and may then use that value in any of the ways disclosed herein in connection with operation 210.

Assigning properties such as "manual input" and "automatic input" to tokens is merely one way to implement the system 100 and is not a limitation of the present invention. Alternatively, for example, the action processor 112 may, at the time of performing operation 210, ask the user 102 to indicate, for each token in the prompt to be provided to the language model, whether the value for that token should be obtained automatically by the action processor 112 or be input manually by the user 102, in response to which the action processor 112 may obtain each token value in accordance with the user's indications.

As yet another example, however the action processor 112 generates the prompt to be provided to the language model, including obtaining initial values for any tokens within that prompt, the action processor 112 may manifest the prompt to the user 102 via the user interface 104, thereby providing the user 102 with an overridable preview of that prompt, which is referred to herein as an "initial prompt." The user 102 may then provide, via the user interface 104, any of a variety of inputs to revise the initial prompt and thereby generate a final prompt, such as by revising token values in the initial prompt and/or revising non-token text in the initial prompt. The action processor 112 may then provide the final prompt to the language model within operation 210.

Prompts of the various kinds disclosed herein may be created to perform a wide range of functions. Some particular, non-limiting examples of use cases for tokenized prompts include:

Rewrite Sentence as a Question:
  Tokenized Prompt: "Rewrite the following sentence as a question: {sentence}"
  Use Case: This is particularly useful when writers are framing research questions or looking to introduce more interactive or engaging language in their writing. It can help transform declarative statements into questions for effect.

Summarize Paragraph:
  Tokenized Prompt: "Summarize the following paragraph: {paragraph}"
  Use Case: Useful for condensing information, this prompt would benefit academic writers, journalists, or anyone who needs to distill long pieces of text into shorter versions without losing essential meaning.

Generate Title:
  Tokenized Prompt: "Create a title for the following blog post: {first_sentence_of_post}"
  Use Case: Bloggers or content creators could use this to come up with catchy, relevant titles for their articles based on the opening sentence or thesis.

Compare and Contrast:
  Tokenized Prompt: "Compare and contrast {entity1} with {entity2}"
  Use Case: Students writing essays or analysts preparing reports can use this prompt to generate comprehensive compare-and-contrast analyses. It could help structure arguments or evaluations in an organized manner.

Thesaurus Substitute:
  Tokenized Prompt: "Provide synonyms for the following word: {word}"
  Use Case: For any writer looking to diversify vocabulary in their text, this prompt can offer alternate word choices to replace repetitive or simplistic terms.

Generate Conclusion:
  Tokenized Prompt: "Based on the following arguments, generate a conclusion: {arguments_list}"
  Use Case: Academic writers or report writers who have outlined their primary points can use this to generate a compelling conclusion that ties all arguments together.

Elaborate Idea:
  Tokenized Prompt: "Elaborate on the following idea: {idea}"
  Use Case: Writers who have a basic concept or notion can use this prompt to flesh out more details, perspectives, or examples to better express and expand upon their initial thought.

Suggest Next Steps:
  Tokenized Prompt: "What are the next steps after {action}?"
  Use Case: Helpful in both project planning and narrative construction, this prompt can guide the writer through logical sequels or action points.

Some particular, non-limiting examples of use cases for tokenized prompts having multiple tokens include:

Context-Aware Style Suggestions:
  Multi-Token Prompt: "Based on {genre} and {audience}, suggest an appropriate writing style."
  Use Case: Writers who are creating a story that spans multiple genres or addresses multiple audiences may need nuanced advice on how to modulate their style. For example, a young adult sci-fi novel would have a different tone than an academic sci-fi analysis.

Dialog Consistency Check:
  Multi-Token Prompt: "Check if character {character_name} in scene {scene_number} maintains a consistent tone and language."
  Use Case: Consistency is key in storytelling. This prompt can help ensure that a character's dialogue remains consistent across different scenes, aiding in character development and narrative coherence.

Revision Helper:
  Multi-Token Prompt: "Revise this {paragraph/sentence} to match a {formal/informal} tone, limit to {word_count} words, and incorporate {keyword}."
  Use Case: This prompt can be a lifesaver during revisions, helping writers efficiently refine their text based on several constraints.

Structured Brainstorming:
  Multi-Token Prompt: "Generate {x} ideas for plot points involving {character_name} in a {setting}."
  Use Case: Writers often need to brainstorm multiple elements simultaneously. This prompt could help them generate plot points specifically focused on a character and a setting.

Summary and Expansion:
  Multi-Token Prompt: "If the paragraph is shorter than {min_word_count}, expand it. If it's longer than {max_word_count}, summarize it."
  Use Case: Different writing projects have different length requirements. This prompt helps writers lengthen or condense their work as needed.

Visual Elements Incorporation
  Multi-Token Prompt: "Based on {theme} and {mood}, suggest some visual elements to include."
  Use Case: Some writers like to incorporate visuals like pictures, graphs, or doodles. This prompt helps them identify what types of visual aids would best suit their work's theme and mood.

Some particular, non-limiting examples of uses of prompts that include conditional statements include:

Genre-Based Style Suggestions:
Conditional Prompt: "If the genre is {genre}, suggest a writing style."
Use Case: This prompt would help writers adapt their language and tone to fit different genres, such as academic, fiction, or journalistic styles.

Audience-Based Language:
Conditional Prompt: "If the audience is {audience_type}, adapt the following sentence: {sentence}"
Use Case: Tailoring the language based on the audience (e.g., general public, experts, children) can help make the content more engaging and appropriate.

Length-Based Summary:
Conditional Prompt: "If the paragraph is longer than {word_count}, summarize it."
Use Case: This prompt would automatically trigger a summary for longer paragraphs, aiding in brevity and readability.

Tense Correction:
Conditional Prompt: "If the tense in the sentence is {tense}, correct it to {desired_tense}."
Use Case: Useful for writers who need to maintain consistent tense throughout their document, especially academic or formal writing.

Emotional Tone Suggestions:
Conditional Prompt: "If the tone is {current_tone}, suggest a way to make it {desired_tone}."
Use Case: This can be especially useful for writers who need to adapt the emotional tone of their message, such as switching from a casual tone to a more formal one, or vice versa.

Verbosity Reduction:
Conditional Prompt: "If the sentence has more than {word_count} words, simplify it."
Use Case: For academic or technical writers who may tend to be verbose, this prompt can help simplify sentences to improve readability.

Context-Based Character Actions:
Conditional Prompt: "If the setting is {setting}, suggest an action for the character {character_name}."
Use Case: For fiction writers, this can help in generating context-appropriate actions or dialogues for characters, adding to story depth.

Citation Reminder:
Conditional Prompt: "If a fact or statistic is mentioned, suggest adding a citation."
Use Case: Useful for academic and research writers to ensure that all factual statements are properly cited, maintaining the document's credibility.

Some particular, non-limiting examples of uses of prompts that include loops include the following. Some of these examples leverage the non-deterministic nature of at least some language models, which is expected to result in generating different outputs by applying the same language model multiple times to the same input. Although each example prompt below is phrased as a single, non-looped, statement, it should be assumed that a suitable prompt could be written with a loop syntax (e.g., using a "for" or "do while" construction, including a loop termination criterion) to form a prompt that defines a loop over the example prompt:

Idea Generation Loop:
Looped Prompt: "Generate a plot idea based on the genre {genre}."
Use Case: Writers often struggle with coming up with unique and engaging plot ideas. This looped prompt could generate multiple plot ideas within a specific genre, allowing the writer to choose the most compelling one.

Dialogue Refinement Loop:
Looped Prompt: "Improve this line of dialogue: {dialogue_line}."
Use Case: Dialogue can make or break a story. A looped prompt that iteratively refines dialogue could help writers achieve more natural and engaging exchanges between characters.

Thesaurus Loop:
Looped Prompt: "Find synonyms for the word {word}."
Use Case: When a writer overuses a particular word, it can make the work monotonous. This loop could provide a list of suitable synonyms for a repetitive word, enhancing the writer's vocabulary and the quality of the writing.

Sentence Complexity Loop:
Looped Prompt: "Rewrite this sentence to make it more complex: {sentence}."
Use Case: Some writing, such as academic papers, requires a more complex sentence structure. Looping this prompt can take a simple sentence and make it more nuanced, adding depth to the paper.

Feedback Loop:
Looped Prompt: "Provide constructive feedback on this paragraph: {paragraph}."
Use Case: Writers need to revise and improve constantly. A loop that provides ongoing feedback can give insights into the strengths and weaknesses of a piece, allowing for iterative improvements.

Some particular, non-limiting examples of uses of chained prompts include:

Research Assistant Chain:
Chained Prompts:
"Search for articles related to {topic}."
"Summarize the top 3 articles."
"Provide citation formats for these articles in {citation_style}."
Use Case: This would be highly useful for academic writers or journalists who are required to back their points with credible sources. It automates the process from finding sources to summarizing them and even formatting citations.

Character Development Chain:
Chained Prompts:
"Generate a basic character profile for {character_name}."
"Suggest three key moments in the character's backstory."
"Write a dialogue scene that reveals one of these key moments."
Use Case: Fiction writers could utilize this chain to create well-rounded characters and integrate them seamlessly into the narrative.

Editing and Refinement Chain:
Chained Prompts:
"Identify passive voice in this {paragraph}."
"Rewrite sentences in active voice."
"Check for readability and suggest improvements."
Use Case: Many writers struggle with editing, particularly when it comes to style and readability. This chained prompt sequence could make the editing process more systematic and effective.

Blog Post Creation Chain:
  Chained Prompts:
    "Generate a list of trending topics in {niche}."
    "Suggest 3 blog post titles for one chosen topic."
    "Create an outline for the chosen blog post."
  Use Case: Bloggers or content marketers could use this chain to streamline the initial stages of content creation, from topic selection to outlining.
Screenplay Structuring Chain
  Chained Prompts:
    "Break down the screenplay into three acts."
    "List key scenes for each act."
    "Outline a dialogue sequence for one key scene."
  Use Case: Screenwriters often have to balance complex narratives within the confines of screenplay structure. This chain could guide them through the process, ensuring that key elements are included in each act.

Some particular, non-limiting examples of use cases for scripted prompts include:
  Automated Formatting:
    Scenario: A writer is preparing a technical manual with specific formatting requirements.
    Scripting Use: A script could auto-format the document by adjusting headings, inserting table of contents, organizing footnotes, or managing citations, all based on the writer's predefined or selected specifications.
  Data Integration & Visualization:
    Scenario: A writer is composing a market research report and wants to integrate live financial data.
    Scripting Use: A script could fetch live market data and integrate it into the document, potentially even producing charts or graphs on the fly.
  Content Personalization:
    Scenario: A content creator wants to send personalized emails or newsletters to their subscribers.
    Scripting Use: A script could adjust the content based on subscriber information, personalizing greetings, recommendations, or other content pieces.
  Language Translation:
    Scenario: A novelist wants to provide a sample translation of their work for international publishers.
    Scripting Use: With integration to a translation API, a script could auto-translate sections or the entirety of the document to a selected language.
  Automated Summary and Metadata Generation:
    Scenario: A researcher is uploading several of their papers to a repository and needs summaries and metadata for each.
    Scripting Use: A script could auto-generate concise summaries, keyword lists, or other metadata based on the content of each paper.
  Interactive Elements for Digital Publishing:
    Scenario: A writer is creating an interactive e-book or digital guide.
    Scripting Use: Scripts could embed interactive elements like quizzes, animations, or clickable maps directly within the document.
  Document Security:
    Scenario: A business professional is preparing a sensitive report and wants to ensure it's encrypted or watermarked.
    Scripting Use: The app could execute a script that encrypts the document, adds a watermark, or integrates other security measures.
  Document Analytics:
    Scenario: A writer wants insights into how readers engage with their digital document.
    Scripting Use: Embedded scripts can track reading time, most engaged sections, or even feedback submissions from readers.
  Real-time Collaboration Tools:
    Scenario: Multiple authors are collaborating on a shared document.
    Scripting Use: A script could highlight recent changes, show who is currently viewing or editing the document, or even enable a chat feature within the app.
  Grammar & Style Enhancement:
    Scenario: A writer is looking for advanced grammar and style checks beyond the basic ones.
    Scripting Use: Integration with advanced linguistic tools or APIs could provide deeper insights, suggestions, and corrections.

Some particular, non-limiting examples of uses of scripted prompts include:
  Character Development Script:
    Scripted Prompt: "If {character_age} is less than 18, suggest 'childhood trauma'. Else, suggest 'adult experiences'."
    Use Case: This script could help writers deepen their character development by providing age-appropriate backstory ideas.
  Setting Generation Script:
    Scripted Prompt: "If {genre} is 'fantasy', generate a medieval setting. If {genre} is 'sci-fi', generate a futuristic city."
    Use Case: This can help writers quickly generate settings that are appropriate to their story's genre, saving time on research and brainstorming.
  Conflict Resolution Script:
    Scripted Prompt: "If {conflict_type} is 'man vs man', suggest a duel. If {conflict_type} is 'man vs nature', suggest a natural disaster."
    Use Case: Determining how a conflict resolves in a story can be challenging. This script provides suggestions based on the type of conflict, helping to move the story forward.
  Emotional Arc Script:
    Scripted Prompt: "If {character_emotion} starts at 'happy', chart an arc that leads to 'sadness', then 'redemption'."
    Use Case: Emotional arcs are crucial for engaging readers. This script could help plan out a character's emotional journey throughout a story.
  Editing and Proofreading Script:
    Scripted Prompt: "Scan {text} for common grammar mistakes. If found, suggest corrections."
    Use Case: This can be a final check for writers to ensure their work is grammatically sound before publishing or submission.

The action definition library 106 may or may not be fixed. The system 100 may, for example, enable the user 102 to add, modify, and/or delete action definitions 108a-n within the action definition library 106 in any of a variety of ways.

For example, in the case of simple text prompts, the system 100 may enable the user 102 to add, modify, and delete one or more of the action definitions 108a-n by, for example, using a text editor-style interface to add, modify, and delete the text of such prompts and associated metadata, such as descriptions and short names of such prompts. Once the user 102 has added or modified one of the action definitions 108*a-n,* such an action definition may be used by the system 100 in any of the ways disclosed herein.

The system 100 may enable the user 102 to add, modify, and delete tokenized prompts within the action definition library 106 in any of the ways disclosed herein in connection with simplified text prompts. In addition, the system 100 may facilitate adding, modifying, and deleting tokens within tokenized prompts in the action definition library 106 in any of a variety of ways, such as in any manner that is known from systems for performing such functions using tokens, e.g., in software Integrated Development Environments (IDEs) and source code editors. Merely as one example, the system 100 may manifest to the user 102 a list of available tokens and enable the user 102 to select any of those tokens for inclusion in the action definition currently being edited by the user 102, in response to which the system 100 may insert the selected token into that action definition, e.g., at the current cursor location/insertion point within that action definition. As another example, the system 100 may provide an auto-complete feature that manifests suggested auto-completions for tokens to the user 102 as the user 102 is editing an action definition, in response to which the user 102 may accept an auto-completion by performing a particular action (e.g., hitting the Tab or Enter key), in response to which the system 100 may insert the accepted token into the action definition at the current cursor location/insertion point within that action definition. As the definition of tokenized prompts implies, the prompt editor may enable the user 102 to insert a token at any position within a prompt, such as immediately before non-tokenized (e.g., plain) text and/or immediately after non-tokenized (e.g., plain) text.

The system 100 may enable the user 102 to add, modify, and delete compound prompts (e.g., chained prompts and/or alternative take prompts) within the action definition library 106 in any of the ways disclosed herein in connection with simplified text prompts and tokenized prompts. In addition, the system 100 may facilitate adding, modifying, and deleting compound prompts in any of a variety of ways. For example, the action definition of a compound prompt may include both the compound prompt's component prompts and metadata/settings that define how the compound prompt will be executed in operation 210, and the system 100 may enable the user 102 to add, modify, and delete both the compound prompt's component prompts and such metadata/settings. Some examples of user interface elements that the system 100 may implement to facilitate editing of compound prompts include the following:

Visual Flow Diagrams: The system 100 may use flow diagrams or visual nodes to represent the compound prompt structure. Chained prompts may be visualized as linked nodes in a linear manner, while alternative take prompts may branch out from a common node.

Toggle Modes: When creating or editing a compound prompt, the system 100 may enable the user 102 to toggle between "Chaining Mode" and "Alternative Take Mode," which will adjust the UI to guide the user 102 in setting up the compound prompt's component prompts according to the user's preferred execution style.

Drag and Drop Interactivity: The system 100 may enable the user 102 to craft compound prompts by dragging individual component prompts into a workspace. Depending on the arrangement or connectors used, the system 100 may recognize the desired execution style.

Descriptive Tooltips: Hovering over a compound prompt in the action definition library 106 may cause the system 100 to show tooltips or brief descriptions of the compound prompt's behavior, making it clear to the user 102 whether the prompt is set up for chaining, alternative takes, or both.

The system 100 may enable the user 102 to add, modify, and delete scripted prompts within the action definition library 106 in any of the ways disclosed herein in connection with simple text prompts, tokenized prompts, and compound prompts. In addition, the system 100 may facilitate adding, modifying, and deleting scripted prompts in any of a variety of ways. For example, the system 100 may provide the user 102 with a script editor having any of the features of a conventional script editor, source code editor, and/or IDE, in combination with any of the features disclosed above in connection with simplified text prompts, tokenized prompts, and compound prompts, to add, modify, and delete action definitions 108*a-n* in the action definition library 106.

Such scripts may be written using an existing scripting language, using a custom-designed scripting language, or any combination thereof. Non-limiting examples of such languages include JavaScript, Python, Ruby, Lua, TypeScript, Bash, Perl, and PowerShell. The term "scripting language" is used broadly herein to include both languages that are commonly referred to as "scripting languages" and languages that are commonly referred to as "programming languages." Such a scripting language may, for example, include the use of variables and other data structures, function definitions and function calls, conditional statements, loops, and any other constructs known within scripting languages.

The system 100 may enable the user 102 to utilize the prompt editor feature to add, edit, or delete action definitions at any time relative to the performance of other actions disclosed herein. This flexibility enables a dynamic and iterative process of creating, applying, and refining action definitions.

For example, the user 102 may use the prompt editor to create a new action definition and then, at a later time, apply the created action definition to selected text using the techniques disclosed herein. Subsequently, the user 102 may return to the prompt editor to revise the previously created action definition. At a later time, the user 102 may apply this revised action definition to other selected text within the same document or a different document.

The user 102 is not limited to applying only the action definitions they have personally created or edited. The user 102 may select and apply any action definition available in the action definition library 106 to selected text, regardless of whether the user 102 created that particular action definition.

Furthermore, the system 100 may enable the user 102 to manually edit the text of the selected document 114 at any time, providing complete flexibility in the document creation and revision process. For example, the user 102 may manually edit the text of the selected document 114 before creating or editing an action definition, after creating or editing an action definition, before applying an action definition to the selected text 116, and/or after applying an action definition to the selected text 116. This flexibility allows the user 102 to seamlessly integrate manual editing with the automated assistance provided by the action definitions 108*a-n,* creating a highly customizable and efficient document revision process.

Although not shown in FIG. 1, the system 100 may store and use any of a variety of settings that may be used within the system 100 and method 200. Furthermore, system 100 may manifest any such settings to the user 102 via the user interface 104 and enable the user 102 to modify any such settings by providing input to the system 100 via the user interface 104, in response to which the system 100 may modify the settings as indicated by the user 102. Some examples of such settings include:

Language model Parameters Configuration: The user 102 may modify settings related to one or more language models used by the system 100. This may include, for example, settings such as the language model's response length, temperature (which affects the randomness of the model's responses), and other parameters that influence the behavior and output of the language model.

Chat Context Selection: The user 102 may have the option to determine how context is managed during interactions with the language model, such as:

No History: Every prompt is executed without any prior chat history. This ensures each interaction is standalone and not influenced by prior inputs.

Ongoing History: An ongoing chat context is maintained. This means that consecutive prompt executions can be influenced by previous interactions, allowing for more context-aware responses from the language model.

Prompt Contextualization: The user 102 may configure how prompts are enriched with context during execution:

Prompt & Selected Text: The language model executes prompts based solely on the content of the prompt itself and any text selected by the user.

Additional Context: Users may add further context to prompts, either by incorporating more portions of the document or by including text from other sources. This may include, for example, any one or more of the following:

Manually provided context by the user.

Context from external data 128, such as one or more databases, files, or web resources.

Embodiments of the present invention have a variety of advantages, such as the following.

In the traditional writing process, every thought is developed and every word is written manually by the writer. This process, while deeply personal, can be slow and often lead to writer's block. Embodiments of the present invention preserve the essence and benefits of manual writing while bypassing the occasional blockades. Embodiments of the present invention use the action definition library 106 (e.g., language model prompts) for brainstorming, refining, and elaborating on the writer's text without replacing the human touch.

Although certain AI-based writing tools exist, such as those that use LLMs to draft entire documents, the resultant piece may not fully capture the writer's voice or intent. Post-creation, the writer often must manually revise word-by-word, which can be cumbersome. In contrast, instead of a one-size-fits-all approach, embodiments of the present invention enable the writer to seamlessly blend his or her own words with AI-generated content. The writer is empowered to decide where to obtain assistance from the system 100 and to what extent, ensuring the final piece resonates with the writer's unique voice.

Although chatbot-based AI tools, such as ChatGPT, may be used to assist writers in generating written works, such tools are useful primarily for creating an entire draft of such works. If the writer then wants to revise a chatbot-generated work, the writer must either revise the entire work manually, or request that the chatbot generate an entire new draft of the work. Chatbots do not, in other words, facilitate editing of works. In contrast, embodiments of the present invention provide writers with granular control over the revision process, enabling them to modify specific sections without overhauling the entire piece, allowing for efficient iterations that take maximum advantage of language models and other computer automation, while preserving the core of the writer's content. In this way, embodiments of the present invention combine the best of computer-automated writing with manual human writing.

Although some LLM-based writing apps, such as Jasper, provide limited features that enable writers to leverage LLMs to revise a draft document, such apps are limited to providing a fixed set of opaque revision commands, such as "summarize," "shorten," "lengthen," and "rephrase." Such apps do not enable the user to see how such commands operate, to modify those commands, or to add commands of their own. In contrast, embodiments of the present invention enable users to customize prompts to reflect the writer's own writing preferences and style.

In short, embodiments of the present invention do not dictate the writer's writing process. Instead, they collaborate with the writer, enabling the writer to write, refine, expand, and restructure documents using whatever mixture of human writing and computer-automated writing and revising the writer prefers, including computer-automated writing and revising defined by the writer.

Although the advantages mentioned above focus primarily on the benefits to the writer, embodiments of the present invention also include a variety of technical innovations that have a variety of technical benefits. For example, embodiments of the present invention are able to merge user-selected text (e.g., the selected text 116) with pre-defined action definitions 108*a-n* (e.g., prompts), which represents a particular way of implementing prompt optimization that represents a technical advancement over existing techniques for generating prompts that do not incorporate user-selected text. Furthermore, by enabling the user 102 to create and modify action definitions (e.g., prompts) in the action definition library 106, to store those action definitions for future use, and to select those stored action definitions for use in connection with the user-selected text 116, embodiments of the present invention enable the generated text 122 to be generated more efficiently than existing solutions that do not enable pre-stored components of a prompt to be selected (e.g., without typing them manually) and then combined with user-selected text (e.g., without requiring such text to be typed manually).

The ability of embodiments of the present invention to enable the user 102 to select multiple non-contiguous selections of text within the selected document 114 provides a variety of advantages. For example, embodiments of the present invention may apply a multi-token prompt to such multi-selections to generate a combined prompt that is based on some or all of the multiple selections. This enables embodiments of the present invention to generate prompts and to perform operations, e.g., using language models (e.g., LLMs), that would either not be possible using existing systems, or that could not be performed as efficiently using existing systems. For example, by enabling multiple non-contiguous text selections to be used to generate the generated text 122 (e.g., by generating a single prompt that incorporates all of the multiple non-contiguous text selections), embodiments of the present invention allow for more intricate interactions with a language model than existing systems by facilitating compound queries or task to be performed using the multiple non-contiguous text selections, such as comparing, contrasting, or merging the multiple non-contiguous text selections and/or concepts represented by those multiple non-contiguous text selections. In contrast, systems that are limited to using contiguous text selections are limited to performing simpler operations on the selected text only, such as rephrasing, summarizing, or expanding the selected text.

As another example, by enabling the user 102 to select multiple non-contiguous text blocks, the system 100 enables richer context to be provided to a language model, thereby enabling the language model to generate more informed and nuanced outputs. In contrast, operations performed on single contiguous text selections tend to lack such broader context, thereby leading to outputs that may not fully capture the intended essence.

As yet another example, by enabling the user 102 to select multiple non-contiguous text blocks, the system 100 may execute complex tasks in a single step (e.g., by providing a single prompt to a language model to generate a single output), rather than performing multiple steps (e.g., by sequentially providing multiple prompts to the language model to generate multiple outputs). As a result, embodiments of the present invention provide an increase in processing efficiency compared to systems that can only be applied to single contiguous text selections.

The ability of embodiments of the present invention to generate, store, modify, and execute compound prompts (e.g., chained prompts and/or alternative take prompts) provides a variety of advantages. For example, the ability to execute compound prompts (e.g., to provide a compound prompt as an input to a language model to generate the generated text 122) enables the system 100 to perform multi-stage content processing. For instance, using a chained prompt, the system 100 may first simplify a complex paragraph (using Component Prompt A in a chained prompt) and then summarize the simplified version (with Component Prompt B in the chained prompt), thereby ensuring the essence is captured in a concise manner. Because the system 100 may execute both component prompts of the chained prompted automatically in sequence, the system 100 enables such sequential processing to be performed more efficiently and effectively than systems that require the user 102 to manually instruct such systems to execute each such component prompt manually.

The ability to apply multiple component prompts within an alternative take compound prompt to generate alternative outputs from the same text selection provides a variety of benefits. For writers, this ability may assist in content brainstorming, assisting in decision-making about plot development, evaluation of multiple hypotheses, and crafting a message for multiple audiences. This feature also provides technical benefits, such as providing the ability to generate a larger amount of text based on the same input as conventional systems that lack the ability to process alternative take prompts automatically.

Yet another technical feature of embodiments of the present invention is that it may be implemented using an event-based design that can perform any of a variety of functions disclosed herein at any time, particularly in response to input received from the user 102 via the user interface 104 at any time. For example, the user 102 may provide first input via the user interface 104 (e.g., input which selects a first instance of the selected action definition 118 and a first instance of the selected text 116), in response to which the action processor 112 may execute a first instance of the method 200 to generate a first instance of the generated text 122. At any subsequent time, the user 102 may provide second input via the user interface 104 (e.g., input which selects a second instance of the selected action definition 118 and a second instance of the selected text 116), in response to which the action processor 112 may execute a second instance of the method 200 to generate a second instance of the generated text 122. Even within such scenarios, the system 100 may receive individual inputs from the user 102, such as inputs selecting the first instance of the selected action definition 118 and the first instance of the selected text 116, at any time, and take action in response to such inputs whenever they are received.

Such event-based processing may be implemented, for example, using object-oriented programming (OOP) techniques in connection with a GUI. As is well-known, the rise of GUIs in the history of software development represented a significant shift in software design paradigms. Earlier software, designed for terminal-style interfaces, operated in a more linear fashion, waiting for a single text-based input from the user. However, the advent of GUIs introduced a far more interactive and dynamic user experience, where multiple types of inputs could be triggered at any time. Event-based OOP emerged as an effective way to design software that could respond flexibly to these multi-faceted, asynchronous user inputs.

Today's chatbot-based writing tools, and writing tools which first receive input from a user and then produce a draft based on the user's input, have the limitations of the terminal-style interfaces of previous generations of software. In contrast, embodiments of the present invention may replace such limitations with the benefits of software that uses an OOP-based GUI, and apply such benefits to the context and generating and editing text. In particular, embodiments of the present invention may respond flexibly to multi-faceted, asynchronous inputs from the user 102.

For example, in an event-based OOP design, and in embodiments of the present invention, actions such as selecting text or choosing a prompt may be treated as events. When these events occur, specific event handlers may be triggered to execute corresponding actions, such as invoking a language model to apply a prompt. This architecture allows for real-time, dynamic interaction between the user 102 and the system 100. Given that the writing process preferred by most human writers is not linear, an event-based design allows the user 102 to make asynchronous revisions to the selected document 114. This enables the user 102 to be free to edit any part of the selected document 114 at any time, in any order, according to their creative flow.

As the above explanation illustrates, embodiments of the present invention differ from existing software applications for providing writing assistance by facilitating the process of revising the selected document 114 based on both human input and computer-generated output, rather than focusing only on the process of generating an initial draft of the selected document 114 automatically. In particular, by enabling the user 102 to apply user-definable action definitions (e.g., prompts) to user-selectable text within the selected document 114, while also enabling the user 102 to manually edit the selected document 114, and to flexibly intersperse such automatic user-configurable revisions with manual edits, embodiments of the present invention provide the user 102 with a combination of the power of computer-automated text generation and revision with the control of manual user text generation and revision, all where and when specified by the user 102, at any level of granularity within the selected document 114.

For example, consider a sequence of events in which:
    the user 102 manually writes an initial draft of the selected document 114;

the user 102 then selects a first sentence within the selected document 114 as a first instance of the selected text 116 and applies a first one of the action definitions 108*a-n* to the first sentence to generate a first instance of the generated text 122, in response to which the document update module 124 replaces the first sentence with the first instance of the generated text 122 in the selected document 114;

the user 102 then manually adds a new paragraph to the selected document 114;

the user 102 then selects a second sentence within the selected document 114 (e.g., within the manually-added new paragraph) as a second instance of the selected text 116 and applies a second one of the action definitions 108*a-n* to the second sentence to generate a second instance of the generated text 122, in response to which the document update module 124 replaces the second sentence with the second instance of the generated text 122 in the selected document 114; and the user 102 then manually revises the second instance of the generated text 122 in the selected document 114.

As the above example illustrates, the user 102 may use embodiments of the system 100 to flexibly add and revise text manually in the selected document 114 and to apply selected (and user-configurable) action definitions from the action definition library 106 to arbitrarily-selected text within the selected document 114, in any sequence and combination, including interspersing manual additions/revisions to the selected document 114 with automatic additions/revisions to the selected document 114 in any combination. This enables the user 102 to take maximum advantage of the benefits of the action processor 112's ability to generate and revise text automatically within the selected document 114, without sacrificing any ability to manually add to and revise text within the selected document 114, and without limiting the use of the action processor 112 merely to generating entire new drafts of the selected document 114 or to performing predefined and non-user-configurable actions on selected text within the selected document 114.

Most efforts on improving the ability of language models, especially LLMs, to assist in the writing process, both in academia and in commercial products, focus on achieving improvements in prompt engineering for the purpose of developing individual prompts that are better able to generate an entire draft of a document. The premise of such efforts is that the goal is to achieve a single prompt that can be used to assist a writer in producing an entire draft of a document. Such efforts fail to recognize both that many writers, especially professional writers of long-form content, prefer or require a writing process that includes making multiple revisions of the document being written, not a single draft produced from whole cloth. Furthermore, it is not even known whether it will be possible to produce written documents that are desired and needed by both writers and audiences solely through improvements in prompt engineering. What is known is that, based on the current state of the art in prompt engineering, the best output currently generated using individual prompts often lack depth, context, and the nuance required in advanced or professional writing tasks, especially when long-form content is needed. Furthermore, the content produced using the current best prompts lack the writer's unique voice, which can only be achieved by the writer manually editing the output generating using such prompts.

Furthermore, writers, especially those engaged in long-term projects like novels and screenplays, often do not have a fully formed set of their own goals at the outset. This makes it impossible to encapsulate all of the writer's requirements in a single prompt. The writing process itself is iterative and the writer's goals may change or become clearer as the draft progresses. A writer may only recognize what needs to be revised or what their true goals are after writing or seeing a draft. A single prompt approach does not offer the flexibility to adapt to these post-draft realizations, making a solely prompt-driven writing process too rigid for the needs of the professional or otherwise sophisticated writer. For this and other reasons, professional writers value and require the ability to revise small portions of their work, making a tool that offers nuanced editing features more aligned with their needs. This contrasts sharply with a model where all the goals have to be stated up front.

In some embodiments, the techniques described herein relate to a method performed by at least one computer processor executing computer program instructions stored on at least one non-transitory computer-readable medium, the method including: (A) receiving, from a user, initial prompt definition input; (B) creating an initial prompt based on the initial prompt definition input; (C) receiving, via a graphical user interface (GUI), input from the user selecting text within a document; (D) receiving, via the GUI, input from the user selecting the initial prompt; (E) generating, based on the selected text and the initial prompt, a processed prompt; (F) providing the processed prompt to a language model to generate output; and (G) updating the document based on the output.

Receiving input from the user selecting text within the document may include receiving input from the user selecting a contiguous block of text within the document or selecting a plurality of non-contiguous blocks of text within the document. Receiving input from the user selecting text within the document may include receiving input from the user dragging across text within a manifestation of the document in the GUI.

Receiving input from the user selecting the initial prompt may include receiving input from the user selecting an identifier of the initial prompt from a list of initial prompt identifiers manifested in the GUI. Receiving input from the user selecting the initial prompt may include receiving input from the user selecting a manifestation of an action definition from a contextual menu.

The initial prompt may include a simple text prompt containing no dynamic content. The initial prompt may include a tokenized prompt, the tokenized prompt including at least one token acting as a placeholder for dynamic content. The initial prompt may include a compound prompt including multiple component prompts that differ from each other.

Providing the processed prompt to the language model may include: (F)(1) performing (F) for each of the compound prompt's multiple component prompts to generate a plurality of outputs; (F)(2) manifesting the plurality of outputs to the user; and (F)(3) receiving, via the GUI, input from the user selecting one of the plurality of outputs.

Providing the processed prompt to the language model may include: (F)(1) performing step (F) for a first component prompt of the compound prompt to generate a first output; and (F)(2) performing step (F) for a second component prompt of the compound prompt, using the first output as an input to the language model, to generate second output.

The initial prompt may include a scripted prompt written in a scripting language.

Generating the processed prompt may include concatenating the initial prompt with the selected text.

The initial prompt may include a tokenized prompt containing a token, and generating the processed prompt may include: (E)(1) obtaining a value for the token; and (E)(2) replacing the token with the value. Obtaining the value for the token may include using a trained model to generate the value. Using the trained model to generate the value may include using the language model to generate the value.

Generating the processed prompt may include: (E)(1) providing the selected text and the initial prompt as inputs to the language model; and (E)(2) receiving the processed prompt as output from the language model.

The language model may be a large language model (LLM).

Providing the processed prompt to the language model may include: (F)(1) receiving, from the user, language model selection input selecting the language model from a plurality of language models; and (F)(2) providing the processed prompt to the language model.

Updating the document based on the output may include inserting the output into the document immediately after the selected text. Updating the document based on the output may include: (G)(1) receiving, via the GUI, input from the user specifying a location in the document other than a location of the selected text; and (G)(2) inserting the output into the document at the user-specified location. Updating the document based on the output may include replacing the selected text in the document with the output. Updating the document based on the output may include: (G)(1) manifesting a preview of the document updated with the output to the user via the GUI; (G)(2) receiving, via the GUI, input from the user accepting the preview; and (G)(3) updating the document in response to receiving the input from the user accepting the preview.

In some embodiments, the techniques described herein relate to a system including at least one non-transitory computer-readable medium having computer program instructions stored thereon, the computer program instructions being executable by at least one computer process to perform a method, the method including: (A) receiving, from a user, initial prompt definition input; (B) creating an initial prompt based on the initial prompt definition input; (C) receiving, via a graphical user interface (GUI), input from the user selecting text within a document; (D) receiving, via the GUI, input from the user selecting the initial prompt; (E) generating, based on the selected text and the initial prompt, a processed prompt; (F) providing the processed prompt to a language model to generate output; and (G) updating the document based on the output.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention may provide input to a language model, such as a large language model (LLM), to generate output. Such a function is inherently rooted in computer technology and cannot be performed mentally or manually. As another example, embodiments of the present invention may be used to automatically generate output using a language model, such as an LLM, and then to automatically update a computer-implemented document based on the output of the language model. As yet another example, embodiments of the present invention may be used to execute arbitrary scripts including conditional statements and loops. All of these functions are inherently rooted in computer technology, are inherently technical in nature, and cannot be performed mentally or manually. Furthermore, embodiments of the present invention constitute improvements to computer technology for using language models, such as LLMs, to generate improved output, and to generate such improved output more efficiently than state-of-the-art technology for the reasons provided herein.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

Although terms such as "optimize" and "optimal" are used herein, in practice, embodiments of the present invention may include methods which produce outputs that are not optimal, or which are not known to be optimal, but which nevertheless are useful. For example, embodiments of the present invention may produce an output which approximates an optimal solution, within some degree of error. As a result, terms herein such as "optimize" and "optimal" should be understood to refer not only to processes which produce optimal outputs, but also processes which produce outputs that approximate an optimal solution, within some degree of error.

What is claimed is:

1. A method performed by at least one computer processor executing computer program instructions stored on at least one non-transitory computer-readable medium, the method comprising:
   (A) receiving, from a user, via a prompt editor of a graphical user interface (GUI), a plurality of initial prompt definition inputs;
   (B) creating plurality of initial prompts from the plurality of initial prompt definition inputs, wherein each of the plurality of initial prompts includes content from a corresponding one of the initial prompt definition inputs;
   (C) receiving, via the GUI, input from the user selecting text within a document, wherein receiving input from the user selecting text within the document comprises receiving input from the user selecting a contiguous block of text within the document;
   (D) receiving, via the GUI, input from the user selecting a particular initial prompt from among the plurality of initial prompts;
   (E) generating, based on the selected text and the particular initial prompt, a processed prompt;
   (F) providing the processed prompt to a language model to generate output; and
   (G) updating the document based on the output.

2. The method of claim 1, wherein receiving input from the user selecting text within the document comprises receiving input from the user dragging across text within a manifestation of the document in the GUI.

3. The method of claim 1, wherein receiving input from the user selecting the particular initial prompt comprises receiving input from the user selecting an identifier of the particular initial prompt from a list of initial prompt identifiers manifested in the GUI.

4. The method of claim 1, wherein receiving input from the user selecting the particular initial prompt comprises receiving input from the user selecting a manifestation of an action definition from a contextual menu.

5. The method of claim 1, wherein the particular initial prompt comprises a simple text prompt containing no dynamic content.

6. The method of claim 1, wherein the particular initial prompt comprises a tokenized prompt, the tokenized prompt comprising at least one token acting as a placeholder for dynamic content.

7. The method of claim 1, wherein the particular initial prompt comprises a compound prompt comprising multiple component prompts that differ from each other.

8. The method of claim 7, wherein (F) comprises:
   (F) (1) performing (F) for each of the compound prompt's multiple component prompts to generate a plurality of outputs;
   (F) (2) manifesting the plurality of outputs to the user; and
   (F) (3) receiving, via the GUI, input from the user selecting one of the plurality of outputs.

9. The method of claim 7, wherein (F) comprises:
   (F) (1) performing step (F) for a first component prompt of the compound prompt to generate a first output; and
   (F) (2) performing step (F) for a second component prompt of the compound prompt, using the first output as an input to the language model, to generate second output.

10. The method of claim 1, wherein the particular initial prompt comprises a scripted prompt written in a scripting language.

11. The method of claim 1, wherein generating the processed prompt comprises concatenating the particular initial prompt with the selected text.

12. The method of claim 1, wherein the particular initial prompt comprises a tokenized prompt containing a token, and wherein generating the processed prompt comprises:
- (E) (1) obtaining a value for the token; and
- (E) (2) replacing the token with the value.

13. The method of claim 12, wherein obtaining the value for the token comprises using a trained model to generate the value.

14. The method of claim 13, wherein using the trained model to generate the value comprises using the language model to generate the value.

15. The method of claim 1, wherein generating the processed prompt comprises:
- (E) (1) providing the selected text and the particular initial prompt as inputs to the language model; and
- (E) (2) receiving the processed prompt as output from the language model.

16. The method of claim 1, wherein the language model comprises a large language model (LLM).

17. The method of claim 1, wherein providing the processed prompt to the language model comprises:
- (F) (1) receiving, from the user, language model selection input selecting the language model from a plurality of language models; and
- (F) (2) providing the processed prompt to the language model.

18. The method of claim 1, wherein updating the document based on the output comprises inserting the output into the document immediately after the selected text.

19. The method of claim 1, wherein updating the document based on the output comprises:
- (G) (1) receiving, via the GUI, input from the user specifying a location in the document other than a location of the selected text; and
- (G) (2) inserting the output into the document at the location specified by the user.

20. The method of claim 1, wherein updating the document based on the output comprises replacing the selected text in the document with the output.

21. The method of claim 1, wherein updating the document based on the output comprises:
- (G) (1) manifesting a preview of the document updated with the output to the user via the GUI;
- (G) (2) receiving, via the GUI, input from the user accepting the preview; and
- (G) (3) updating the document in response to receiving the input from the user accepting the preview.

22. A system comprising at least one non-transitory computer-readable medium having computer program instructions stored thereon, the computer program instructions being executable by at least one computer process to perform a method, the method comprising:
- (A) receiving, from a user, via a prompt editor of a graphical user interface (GUI), a plurality of initial prompt definition inputs;
- (B) creating a plurality of initial prompts from the plurality of initial prompt definition inputs, wherein each of the plurality of initial prompts includes content from a corresponding one of the initial prompt definition inputs;
- (C) receiving, via the GUI, input from the user selecting text within a document, wherein receiving input from the user selecting text within the document comprises receiving input from the user selecting a contiguous block of text within the document;
- (D) receiving, via the GUI, input from the user selecting a particular initial prompt from among the plurality of initial prompts;
- (E) generating, based on the selected text and the particular initial prompt, a processed prompt;
- (F) providing the processed prompt to a language model to generate output; and
- (G) updating the document based on the output.

* * * * *